United States Patent
Halepovic et al.

(10) Patent No.: US 11,490,149 B2
(45) Date of Patent: Nov. 1, 2022

(54) CAP-BASED CLIENT-NETWORK INTERACTION FOR IMPROVED STREAMING EXPERIENCE

(71) Applicants: AT&T Intellectual Property I, L.P., Atlanta, GA (US); Niklas Carlsson, Linköping (SE); Vengatanathan Krishnamoorthi, Linköping (SE)

(72) Inventors: Emir Halepovic, Somerset, NJ (US); Niklas Carlsson, Linköping (SE); Vengatanathan Krishnamoorthi, Linköping (SE)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 16/354,823

(22) Filed: Mar. 15, 2019

(65) Prior Publication Data
US 2020/0296442 A1    Sep. 17, 2020

(51) Int. Cl.
*H04N 21/2662* (2011.01)
*H04N 21/414* (2011.01)
(Continued)

(52) U.S. Cl.
CPC ..... *H04N 21/2662* (2013.01); *H04L 65/4069* (2013.01); *H04L 65/602* (2013.01); *H04L 65/80* (2013.01); *H04N 21/414* (2013.01)

(58) Field of Classification Search
CPC ............ H04N 21/2662; H04N 21/414; H04N 21/2402; H04N 21/2401; H04N 21/23805;
(Continued)

(56) References Cited

U.S. PATENT DOCUMENTS

| 5,884,037 A | 3/1999 | Aras et al. |
| 6,269,078 B1 | 7/2001 | Lakshman et al. |

(Continued)

FOREIGN PATENT DOCUMENTS

| EP | 2557830 A1 | 2/2013 |
| WO | 2009149100 A1 | 12/2009 |

(Continued)

OTHER PUBLICATIONS

Agboma, et al., "Quality of experience management in mobile content delivery systems." Telecommunication Systems 49.1 (2012): 85-98.

(Continued)

*Primary Examiner* — Tonia L Dollinger
*Assistant Examiner* — Mehulkumar J Shah
(74) *Attorney, Agent, or Firm* — Guntin & Gust, PLC; Matthew Tropper

(57) ABSTRACT

Aspects of the subject disclosure may include, for example, setting a streaming rate cap for a client device; obtaining a bitrate ladder associated with the client device, wherein the bitrate ladder comprises a listing of a plurality of bitrates that the client device can request in connection with receiving streaming data; determining a boost rate for the client device, wherein the boost rate is greater than the streaming rate cap such that the boost rate enables the client device to receive the streaming data faster than the client device would otherwise receive the streaming data under the streaming rate cap, and wherein the boost rate is based upon the bitrate ladder; and enabling delivery to the client device of the streaming data up to the boost rate; wherein a network device is part of a network through which the streaming data is delivered to the client device. Other embodiments are disclosed.

20 Claims, 25 Drawing Sheets

(51) Int. Cl.
*H04L 29/06* (2006.01)
*H04L 65/60* (2022.01)
*H04L 65/61* (2022.01)
*H04L 65/80* (2022.01)

(58) Field of Classification Search
CPC ...... H04N 21/238; H04N 21/24; H04L 65/80; H04L 65/602; H04L 65/4069; H04L 29/06; H04L 65/4084; H04L 65/61; H04L 65/60; H04L 65/612
USPC .................. 709/219, 217; 375/219; 340/16.1
See application file for complete search history.

(56) References Cited

U.S. PATENT DOCUMENTS

| | | |
|---|---|---|
| 6,707,862 B1 | 3/2004 | Larsson |
| 6,842,463 B1 | 1/2005 | Drwiega et al. |
| 6,912,229 B1 | 6/2005 | Lauro et al. |
| 7,047,309 B2 | 5/2006 | Baumann et al. |
| 7,174,178 B2 | 2/2007 | Bergel |
| 7,310,682 B2 | 12/2007 | Hatime |
| 7,415,038 B2 | 8/2008 | Ullmann et al. |
| 7,499,453 B2 | 3/2009 | Carlson et al. |
| 7,535,839 B2 | 5/2009 | Kadaba et al. |
| 7,536,469 B2 | 5/2009 | Chou et al. |
| 7,545,749 B2 | 6/2009 | Jourdain et al. |
| 7,630,401 B2 | 12/2009 | Iwamura |
| 7,650,421 B2 | 1/2010 | Patrick et al. |
| 7,743,183 B2 | 6/2010 | Virdi et al. |
| 7,796,514 B2 | 9/2010 | Noriega |
| 7,797,723 B2 | 9/2010 | Demircin et al. |
| 8,307,108 B2 | 11/2012 | Chen et al. |
| 8,391,896 B2 | 3/2013 | Curcio et al. |
| 8,443,404 B2 | 5/2013 | Chetlur et al. |
| 8,503,336 B2 | 8/2013 | Rappaport et al. |
| 8,577,330 B2 | 11/2013 | Reagor |
| 8,644,154 B2 | 2/2014 | Vivanco et al. |
| 8,713,195 B2 | 4/2014 | Pickens et al. |
| 8,804,515 B2 | 8/2014 | Kampmann et al. |
| 8,812,673 B2 | 8/2014 | Balachandran et al. |
| 8,854,958 B2 | 10/2014 | Gell et al. |
| 8,959,244 B2 | 2/2015 | Lin et al. |
| 9,037,099 B2 | 5/2015 | Li et al. |
| 9,191,284 B2 | 11/2015 | Kordasiewic et al. |
| 9,191,322 B2 | 11/2015 | Schlack et al. |
| 9,237,361 B2 | 1/2016 | Youssefmir et al. |
| 9,306,994 B2 | 4/2016 | Gahm et al. |
| 9,331,944 B2 | 5/2016 | Swenson et al. |
| 9,344,476 B2 | 5/2016 | Kampmann et al. |
| 9,438,393 B2 | 9/2016 | Kobayashi et al. |
| 9,462,032 B2 | 10/2016 | Lieber |
| 9,485,289 B2 | 11/2016 | Zhu et al. |
| 9,496,984 B2 | 11/2016 | Christoffersson et al. |
| 9,503,384 B1 | 11/2016 | Oliveria et al. |
| 9,553,803 B2 | 1/2017 | Xiao et al. |
| 9,608,934 B1 | 3/2017 | Kalman et al. |
| 9,635,080 B2 | 4/2017 | Karlsson et al. |
| 9,654,361 B2 | 5/2017 | Vasseur et al. |
| 9,661,515 B2 | 5/2017 | Lord et al. |
| 9,699,489 B2 | 7/2017 | Iwamura |
| 9,756,112 B2 | 9/2017 | Jana et al. |
| 9,763,137 B2 | 9/2017 | Allanki et al. |
| 9,775,160 B2 | 9/2017 | Schmidt |
| 9,800,912 B2 | 10/2017 | Phillips et al. |
| 9,832,503 B2 | 11/2017 | Phillips |
| 9,838,893 B2 | 12/2017 | Grinshpun et al. |
| 9,979,663 B2 | 5/2018 | Robitaille |
| 9,992,690 B2 | 6/2018 | Butchko et al. |
| 10,062,036 B2 | 8/2018 | Mermoud et al. |
| 10,097,404 B2 | 10/2018 | Yadav et al. |
| 10,178,043 B1* | 1/2019 | Ganjam ............ H04L 65/4084 |
| 10,397,123 B2 | 8/2019 | Jana et al. |
| 10,595,191 B1 | 3/2020 | Mueller |
| 2003/0086514 A1 | 5/2003 | Ginis et al. |
| 2004/0259555 A1 | 12/2004 | Rappaport et al. |
| 2005/0124347 A1 | 6/2005 | Hosein |
| 2005/0289618 A1 | 12/2005 | Hardin |
| 2006/0003767 A1 | 1/2006 | Kim et al. |
| 2006/0067214 A1 | 3/2006 | Ramachandran |
| 2006/0121908 A1 | 6/2006 | Kikinis |
| 2006/0256130 A1 | 11/2006 | Gonzalez |
| 2007/0002743 A1 | 1/2007 | Fan |
| 2007/0153916 A1 | 7/2007 | Demircin et al. |
| 2007/0217448 A1 | 9/2007 | Luo et al. |
| 2007/0286213 A1 | 12/2007 | Fodor et al. |
| 2009/0028182 A1 | 1/2009 | Brooks et al. |
| 2009/0064242 A1* | 3/2009 | Cohen ............ H04N 21/44016 725/90 |
| 2010/0121977 A1 | 5/2010 | Kontola et al. |
| 2010/0312905 A1 | 12/2010 | Sandmann et al. |
| 2011/0119370 A1 | 5/2011 | Huang et al. |
| 2011/0219142 A1 | 9/2011 | Lin et al. |
| 2012/0004960 A1 | 1/2012 | Ma et al. |
| 2012/0005365 A1 | 1/2012 | Ma et al. |
| 2012/0157106 A1 | 6/2012 | Wang et al. |
| 2012/0157147 A1 | 6/2012 | Christoffersson et al. |
| 2012/0257671 A1 | 10/2012 | Brockmann et al. |
| 2012/0265892 A1 | 10/2012 | Ma et al. |
| 2012/0331106 A1 | 12/2012 | Ramamurthy et al. |
| 2013/0007831 A1* | 1/2013 | Wu ............ H04N 21/2385 725/116 |
| 2013/0035107 A1 | 2/2013 | Chan et al. |
| 2013/0094388 A1 | 4/2013 | Furuskaer et al. |
| 2013/0133011 A1 | 5/2013 | Chhaochharia et al. |
| 2013/0263167 A1 | 10/2013 | Parthasarathy et al. |
| 2013/0322242 A1 | 12/2013 | Swenson et al. |
| 2014/0082192 A1 | 3/2014 | Wei |
| 2014/0098697 A1 | 4/2014 | Wang et al. |
| 2014/0098748 A1 | 4/2014 | Chan et al. |
| 2014/0143440 A1* | 5/2014 | Ramamurthy ... H04N 21/23439 709/231 |
| 2014/0146693 A1 | 5/2014 | Chetlur et al. |
| 2016/0014620 A1 | 1/2016 | Narayanan et al. |
| 2016/0028647 A1 | 1/2016 | Ramakrishnan et al. |
| 2016/0044133 A1 | 2/2016 | Gibbon et al. |
| 2016/0135076 A1 | 5/2016 | Grinshpun et al. |
| 2016/0234078 A1* | 8/2016 | Jana ...................... H04L 67/02 |
| 2016/0261514 A1 | 9/2016 | Gopinathan et al. |
| 2016/0301770 A1 | 10/2016 | Marra et al. |
| 2016/0353299 A1 | 12/2016 | Sayeed et al. |
| 2016/0366565 A1 | 12/2016 | Fjelberg et al. |
| 2017/0054648 A1 | 2/2017 | Ngo-Tan et al. |
| 2017/0085950 A1* | 3/2017 | Halepovic .......... H04N 21/2402 |
| 2017/0149690 A1 | 5/2017 | Le Rudulier et al. |
| 2017/0202000 A1 | 7/2017 | Fu et al. |
| 2017/0244639 A1 | 8/2017 | Szilagyi et al. |
| 2017/0331752 A1 | 11/2017 | Jana |
| 2018/0027039 A1 | 1/2018 | Moorthy et al. |
| 2018/0027130 A1 | 1/2018 | Yermakov et al. |
| 2018/0054377 A1 | 2/2018 | Polychronis |
| 2018/0103283 A1 | 4/2018 | Liu et al. |
| 2018/0137412 A1 | 5/2018 | Nikkhah et al. |
| 2018/0139261 A1 | 5/2018 | Sintorn et al. |
| 2018/0160160 A1* | 6/2018 | Swaminathan ...... H04N 21/816 |
| 2018/0167179 A1 | 6/2018 | Huang et al. |
| 2018/0176624 A1 | 6/2018 | Phillips et al. |
| 2018/0234320 A1 | 8/2018 | Paulraj et al. |
| 2018/0295056 A1 | 10/2018 | Xiao et al. |
| 2018/0310258 A1 | 10/2018 | Goria et al. |
| 2019/0238461 A1* | 8/2019 | Miller ................ H04L 41/5025 |
| 2019/0246094 A1 | 8/2019 | Mate et al. |
| 2019/0334794 A1 | 10/2019 | Halepovic et al. |
| 2019/0334824 A1 | 10/2019 | Jana et al. |
| 2020/0075032 A1* | 3/2020 | Joseph ............... H04W 52/287 |
| 2020/0076520 A1 | 3/2020 | Jana et al. |
| 2020/0186430 A1 | 6/2020 | Halepovic et al. |
| 2020/0204979 A1 | 6/2020 | Mueller |

(56) References Cited

U.S. PATENT DOCUMENTS

| | | | |
|---|---|---|---|
| 2020/0252147 | A1 | 8/2020 | Jana et al. |
| 2021/0184979 | A1 | 6/2021 | Jana et al. |

FOREIGN PATENT DOCUMENTS

| | | | |
|---|---|---|---|
| WO | 2010060106 | A1 | 5/2010 |
| WO | 2010085043 | A2 | 7/2010 |
| WO | 2017058247 | A1 | 4/2017 |
| WO | 2017084723 | A1 | 5/2017 |
| WO | 2017127000 | A1 | 7/2017 |
| WO | 2017166119 | A1 | 10/2017 |
| WO | WO2018082988 | | 5/2018 |

OTHER PUBLICATIONS

Arestrom, Erik, "Flow Classification of Encrypted Traffic Streams using Multifractal Features", https://liu.diva-portal.org/smash/get/diva2:1220169/FULLTEXT01.pdf, Linkoping University,, 2018.

Choi, Sunghyun et al., "Predictive and Adaptive Bandwidth Reservation for Hand-Offs in QoS-Sensitive Cellular Networks", ACM SIGCOMM Computer Communication Review. vol. 28. No. 4. ACM, 1998., 1998, 12 pages.

Covell, Michele et al., "Calibration and Prediction of Streaming-Server Performance", HP Labs Tecnical Report HPL-2004-206 (2004)., 2004, 13 pages.

Elo, Hans-Filip, "Exploring web protocols for use on cellular networks: QUIC on poor network links", https://liu.diva-portal.org/smash/get/diva2:1220465/FULLTEXT01.pdf, Linkoping University, 2017.

Haakon, Riiser et al., "Bitrate and video quality planning for mobile streaming scenarios using a GPS-based bandwidth lookup service." Multimedia and Expo (ICME), 2011 IEEE International Conference on. IEEE, 2011.

He, Lijun et al., "Content and buffer status aware packet scheduling and resource management framework for video streaming over LTE system", EURASIP Journal on Image and Video Processing Jan. 2017, 73, 2017.

Kamel, Ammar M., "Client-Based QoS Monitoring and Evaluation Architecture for Network Infrastructure and Services", Western Michigan University ScholarWorks at WMU, Dec. 2013, 130 pages.

Krishnamoorthi, Vengatanathan et al., "Slow but Steady: Cap-based Client-Network Interaction for Improved Streaming Experience", Authors Version—Proceedings of the IEEE/ACM International Symposium on Quality of Service (IEEE/ACM IWQoS), 2018.

Krishnamoorthi, Vengatanathan et al., "Slow but Steady: Cap-based Client-Network Interaction for Improved Streaming Experience", 978-1-5386-2542—Feb. 2018 c 2018 IEEE, Jun. 2018, 10pgs.

Oyman, et al., "Quality of experience for HTTP adaptive streaming services." Communications Magazine, IEEE 50.4 (2012): 20-27.

Sun, Yi, "CS2P: Improving Video Bitrate Selection and Adaptation with Data-Driven Throughput Prediction", Proceedings of the 2016 ACM SIGCOMM Conference. ACM, 2016., 2016, 14 pages.

Tumuluru, Vamsi K. et al., "Channel status prediction for cognitive radio networks", Wireless Communications and Mobile Computing 12.10 (2012): 862-874., 2012, 13 pages.

Yanggratoke, Rerngvit et al., "Predicting Real-time Service-level Metrics from Device Statistics", KTH Technical Report TRITA-EE, 2014:053; URN:NBN:SE:KTH:DIVA-152637., Sep. 29, 2014, 9 pages.

Yin, Sixing et al., "Prediction-Based Throughput Optimization for Dynamic Spectrum Access", IEEE transactions on vehicular technology 60.3 (2011): 1284-1289., Mar. 2011, 6 pages.

Zou, Xuan K. et al., "Can accurate predictions improve video streaming in cellular networks?", Proceedings of the 16th International Workshop on Mobile Computing Systems, Feb. 2015, 6 pages.

"Home—Dash—Industry-Forum/dash.js Wiki—GitHub", https://github.com/Dash-Industry-Forum/dash.js/wiki, May 15, 2018, 5 pp.

"ISO/IEC FDIS 23009-5:2017: Information Technology—Dynamic adaptive streaming over HTTP (DASH)", Part 5: Server and network assisted DASH (SAND), 2017, 11 pp.

"ITU-T P.1203: Objective video QoE standard", https://www.itu.int/rec/T-REC-P.1203, 2016.

Krishnamoorthi, Vengatanathan, et al., "Quality-adaptive Prefetching for Interactive Branched Video using HTTP-based Adaptive Streaming", 2014ACM 978-1-4503-3063, 2014, 10pp.

"VQEG: Objective video quality assessment", https://www.its.bldrdoc.gov/vqeg/projects/audiovisual-hd.aspx, 2018, 3 pp.

Akhshabi, Saamer, et al., "Serverbased traffic shaping for stabilizing oscillating adaptive streaming players", Proc. ACM NOSSDAV, 2013, 4 pp.

Bentaleb, Abdelhak, "SDNDASH: Improving QoE of HTTP Adaptive Streaming Using Software Defined Networking", Proc. ACM MMSyS, 2016, 10 pp.

Bhat, Divyashri, "Network Assisted Content Distribution for Adaptive Bitrate Video Streaming", Proc. MMSys, 2017, 14 pp.

Bouten, Niels, et al., "In-Network Quality Optimization for Adaptive Video Streaming Services", IEEE Trans. on Multimedia, vol. 16, No. 8, pp. 2281-2293, 2014, 1 p.

Bouten, Niels, "QoE-Driven In-Network Optimization for Adaptive Video Streaming Based on Packet Sampling Measurements", Computer Networks, 2015, 20 pp.

Carbone, Marta et al., "Dummynet revisited", ACM SIGCOMM Computer Communication Review, vol. 40, pp. 12-20, 2010., 2010, 8 pp.

Casas, Pedro, et al., "YOUQMON: A System for Online Monitoring of YouTube QoE in Operational 3G Networks", ACM SIGMETRICS Perform. Eval. Rev., vol. 41, pp. 44-46, 2013, 4 pp.

Cofano, G., et al., "Design and Experimental Evaluation of Network-assisted Strategies for HTTP Adaptive Streaming", Proc. ACM MMSyS, 2016, 12 pp.

Dimopoulos, Georgios, et al., "Measuring Video QoE from Encrypted Traffic", Proc. IMC, 2016., 2016, 14 pp.

Dobrian, Florin, et al., "Understanding the Impact of Video Quality on User Engagement", SIGCOMM'11, Aug. 15-19, 2011, Toronto, Ontario, Canada., 2011, 12 pp.

Flach, Tobias, et al., "An Internet-Wide Analysis of Traffic Policing", University of Southern California; Google; Proc. ACM SIGCOMM, 2016, 15 pp.

Hamer, Greg, "Open Source Media Framewrok Introduction and Overview Adobe Developer Connection", https://www.adobe.com/devnet/video/articles1/osmf_overview.html, 2010, 9 pp.

Hobfeld, Tobias, et al., "Identifying QoE Optimal Adaptation of HTTP Adaptive Streaming Based on Subjective Studies", Computer Networks, 2015., 2015, 23 pp.

Houdaille, Remi, "Shaping HTTP adaptive streams for a better user experience", Proc. ACM MMSys,, 2012, 4 pp.

Houdaille, Remi, et al., "Shaping http adaptive streams for a better user experience", Proc. ACM MMSys, 2012, 4 pp.

Huang, Te-Yuan, et al., "Confused, Timid, and Unstable: Picking a Video Streaming Rate is Hard", Stanford University; {huangty,nikhilh,brandonh,nickm,ramesh.johari}@stanford.edu, 2012, 14 pp.

Kakhki, Arash Molavi, et al., BingeOn Under the Microscope: Understanding T-Mobile's Zero-Rating Implementation, Proc. Internet-QoE Workshop, 2016, 6 pp.

Kleinrouweler, Jan Willem, et al., "Delivering Stable High-Quality Video: An SDN Architecture with DASH Assisting Network Elements", Proc. ACM MMSyS, 2016, 10 pp.

Krishnamoorthi, Vengatanathan, et al., "Helping Hand or Hidden Hurdle: Proxy-assisted HTTP-based Adaptive Streaming Performance", IEEE MASCOTS, 2013, 10 pp.

Krishnamoorthi, Vengatanathan, et al., "BUFFEST: Predicting Buffer Conditions and Realtime Requirements of HTTP(S) Adaptive Streaming Clients", Proc. ACM MMSys,, 2017, 13 pp.

Krishnan, S. Shunmuga, et al., "Video Stream Quality Impacts Viewer Behavior: Inferring Causality Using Quasi-Experimental Designs", IMC'12, Nov. 14-16, 2012, Boston, Massachusetts, USA., 2012, 14 pp.

(56) References Cited

OTHER PUBLICATIONS

Mangla, Tarun, et al., "MIMIC: Using passive network measurements to estimate HTTP-based adaptive video QoE metrics", Proc. IEEE/IFIP TMA, 2017, 6 pp.

Mangla, Tarun, et al., "VideoNOC: Assessing Video QoE for Network Operators Using Passive Measurements", Proc. MMSys, Jun. 12, 2018, 12 pp.

Petrangeli, Stefano, et al., "Software-Defined Network-based Prioritization to Avoid Video Freezes in HTTP Adaptive Streaming", Int. Journ. of Netw. Management, 2016, 23 pp.

Qadir, Qahhar Muhammad, et al., "Mechanisms for QoE optimisation of Video Traffic: A review paper", Australasian Journal of Information, Communication Technology and Applications, 2015, 18 pp.

Rao, Ashwin, et al., "Network Characteristics of Video Streaming Traffic", ACM CoNEXT, 2011, 12 pp.

Riiser, Haakon, et al., "Commute Path Bandwidth Traces from 3G Networks: Analysis and ApplicationsCommute Path Bandwidth Traces from 3G Networks: Analysis and Applications", Proc. ACM MMSys, 2013, 5 pp.

Spiteri, Kevin, et al., "BOLA: Near-Optimal Bitrate Adaptation for Online Videos", IEEE INFOCOM, 2016, 12 pp.

Spiteri, Kevin, et al., "From Theory to Practice: Improving Bitrate Adaptation in the DASH Reference Player", 2018 Copyright held by the owner/author(s). Publication rights licensed to Association for Computing Machinery. ACM ISBN 978-1-4503-5192—Aug. 18, 2006. https://doi.org/10.1145/3204949.3204953, Jun. 12, 2018, 15 pp.

Sun, Yi, t al., "CS2P: Improving Video Bitrate Selection and Adaptation with Data-Driven Throughput Prediction", Proc ACM SIGCOMM, 2016, 14 pp.

Vleeschauwer, D. D., et al., "Optimization of http adaptive streaming over mobile cellular networks", Proc. IEEE INFOCOM, 2013, 2 pp.

Vleeschauwer, Danny DE, et al., "Optimization of http adaptive streaming over mobile cellular networks", Proc. IEEE INFOCOM, 2013, 4 pp.

Wu, Tingyao, et al., "Network-based video freeze detection and prediction in HTTP adaptive streaming", Comp. Comm., vol. 99, pp. 37-47, 2017, 3 pp.

Zahran, Ahmed H., "SAP: Stall-Aware Pacing for Improved DASH Video Experience in Cellular Networks", Proc. ACM MMSys, 2017, 15 pp.

Zhi, Li, et al., "Probe and Adapt: Rate Adaptation for HTTP Video Streaming At Scale", IEEE Journal on Selected Areas in Communications, 2014, 15 pp.

Benno, Steven A., et al., "Adaptive streaming: The network HAS to help", Bell Lab Technical Journal, 2011, 7 pp.

\* cited by examiner

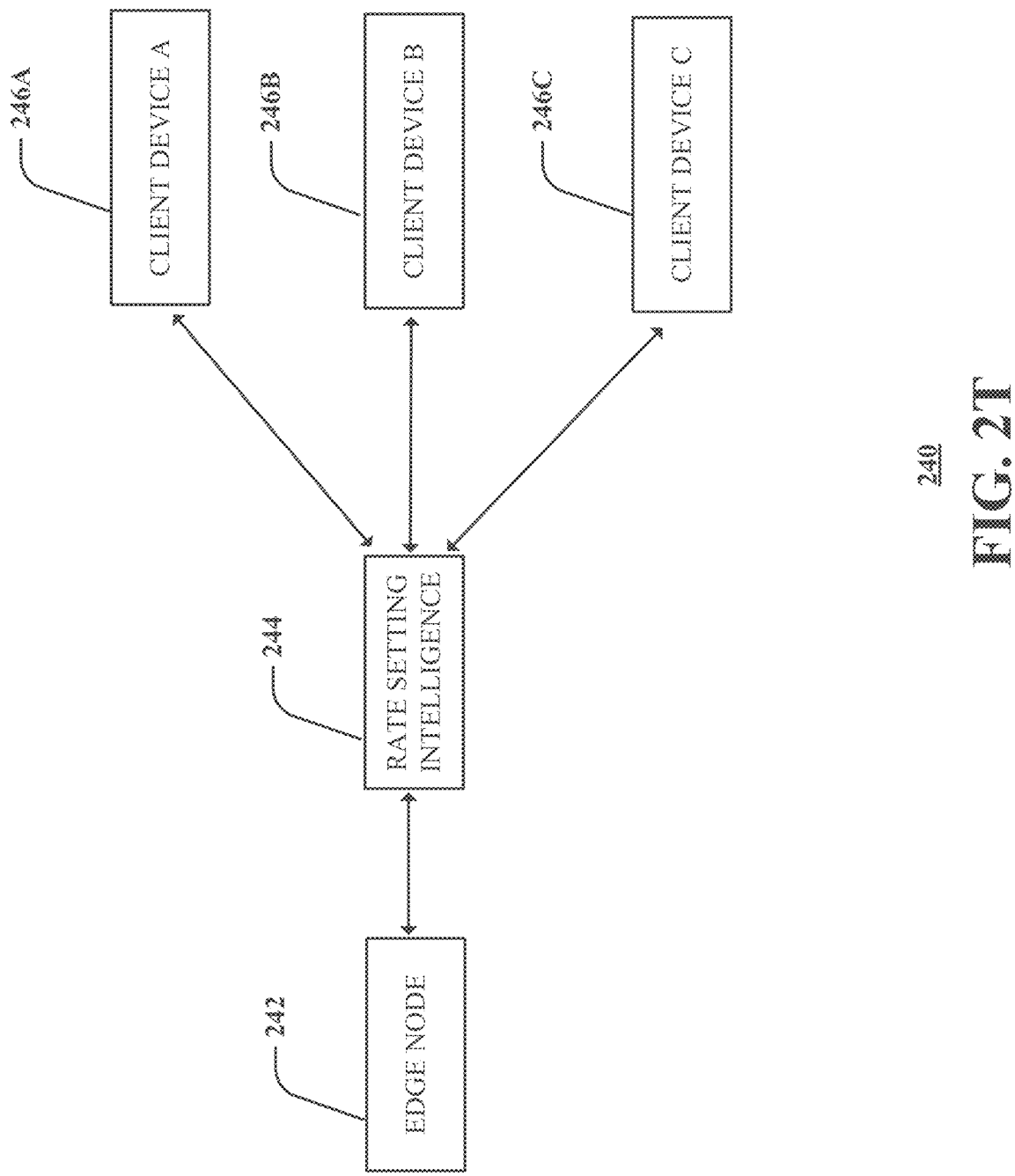

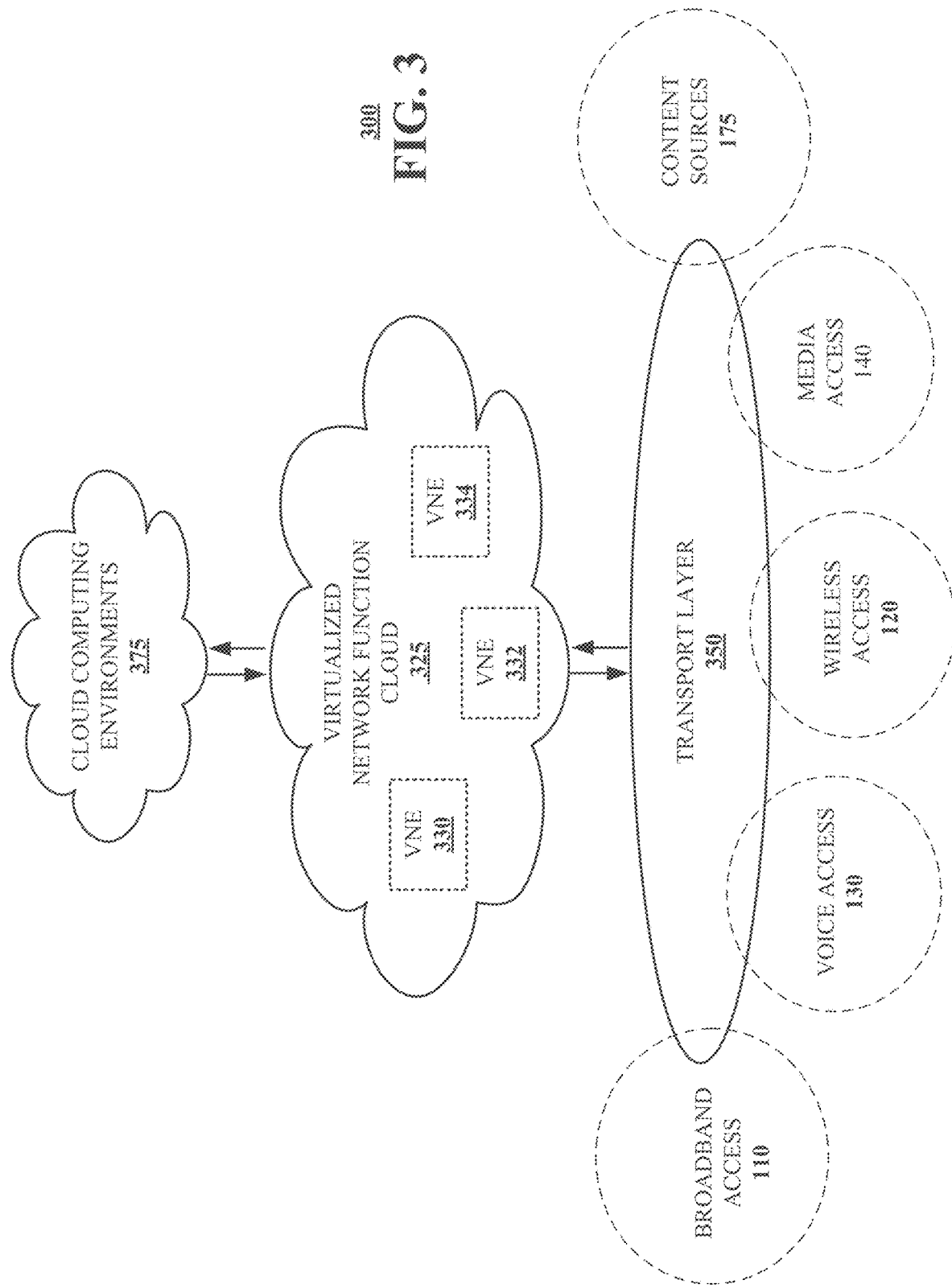

CAP-BASED CLIENT-NETWORK INTERACTION FOR IMPROVED STREAMING EXPERIENCE

FIELD OF THE DISCLOSURE

The subject disclosure relates to a cap-based client-network interaction for improved streaming experience.

BACKGROUND

HTTP Adaptive Streaming (HAS) has become the dominant approach for video delivery due to its ability to use the existing web infrastructure and to adapt to diverse network conditions for a variety of clients. Adaptation algorithms in HAS clients determine quality levels requested by clients to maintain high Quality of Experience (QoE). While QoE is a subjective measure, it is known that playback stalls, long startup delay and fluctuating quality levels significantly affect QoE (see [1] F. Dobrian, V. Sekar, A. Awan, I. Stoica, D. Joseph, A. Ganjam, J. Zhan, and H. Zhang, "Understanding the impact of video quality on user engagement," in Proc. ACM SIGCOMM, 2011; [2] S. Krishnan and R. Sitaraman, "Video stream quality impacts viewer behavior: Inferring causality using quasi-experimental designs," in Proc. IMC, 2012; [3] T. Huang, N. Handigol, B. Heller, N. McKeown, and R. Johari, "Confused, timid, and unstable: Picking a video streaming rate is hard," in Proc. ACM IMC, 2012; [4] T. Hossfeld, M. Seufert, C. Sieber, T. Zinner, and P. Tran-Gia, "Identifying QoE optimal adaptation of HTTP adaptive streaming based on subjective studies," Computer Networks, 2015), and that QoE can be represented by objective metrics, such as visual quality (e.g., expressed as a bitrate), stalls, quality switching, and startup delay (see [5] "VQEG: Objective video quality assessment," 2018. [Online]. Available: https://www.its.bldrdoc.gov/vqeg/projects/audiovisual-hd.aspx; [6] "ITU-T P. 1203: Objective video QoE standard," 2018. [Online]. Available: https://www.itu-.int/rec/T-REC-P.1203).

While variability in link capacity can lead to stalls and unstable quality, such issues can occur even on stable links when multiple adaptive players compete for bandwidth, and some or all of them attempt video quality (bitrate) above the sustainable level ([[7] S. Akhshabi, L. Anantakrishnan, C. Dovrolis, and A. C. Begen, "Serverbased traffic shaping for stabilizing oscillating adaptive streaming players," in Proc. ACM NOSSDAV, 2013). In addition, some streaming services ignore client device context, such as screen size, and attempt to stream video at too high bitrates to add further utility to small screen users. This wastes bandwidth, causes unfairness and eats into users' data on metered links, such as cellular.

BRIEF DESCRIPTION OF THE DRAWINGS

Reference will now be made to the accompanying drawings, which are not necessarily drawn to scale, and wherein:

FIG. 2O depicts average buffer size over time, after boosting, according to various embodiments.

FIG. 2T is a block diagram illustrating an example, non-limiting embodiment of a system 240 (e.g., for delivering streaming data to one or more client devices) functioning within the communication network of FIG. 1 in accordance with various aspects described herein.

FIG. 3 is a block diagram illustrating an example, non-limiting embodiment of a virtualized communication network in accordance with various aspects described herein.

DETAILED DESCRIPTION

The subject disclosure describes, among other things, illustrative embodiments directed to cap-based client-network interaction for improved streaming experience. Other embodiments are described in the subject disclosure.

As described herein, due to widespread popularity of streaming services, many streaming clients typically compete over bottleneck links for their own bandwidth share. However, in such environments, the rate adaptation algorithms used by modern streaming clients often result in instability and unfairness, which negatively affects the playback experience. In addition, mobile clients often waste bandwidth by trying to stream excessively high video bitrates. Various embodiments described herein provide a cap-based framework in which the network and clients cooperate to improve the overall Quality of Experience (QoE). Described below is a comprehensive study showing that a fixed rate cap comes with both benefits (e.g., data savings, improved stability and fairness) and drawbacks (e.g., higher startup times and slower recovery after stalls). To address the drawbacks while keeping the benefits, provided according to various embodiments is a framework that includes (i) buffer-aware rate caps in which the network temporarily boosts the rate cap of clients during video startup and under low buffer conditions; and/or (ii) boost-aware client-side adaptation algorithms that optimize the bitrate selection during the boost periods. Combined with information sharing between the network and clients, these mechanisms are shown to improve QoE, while reducing wasted bandwidth.

Figure 1:
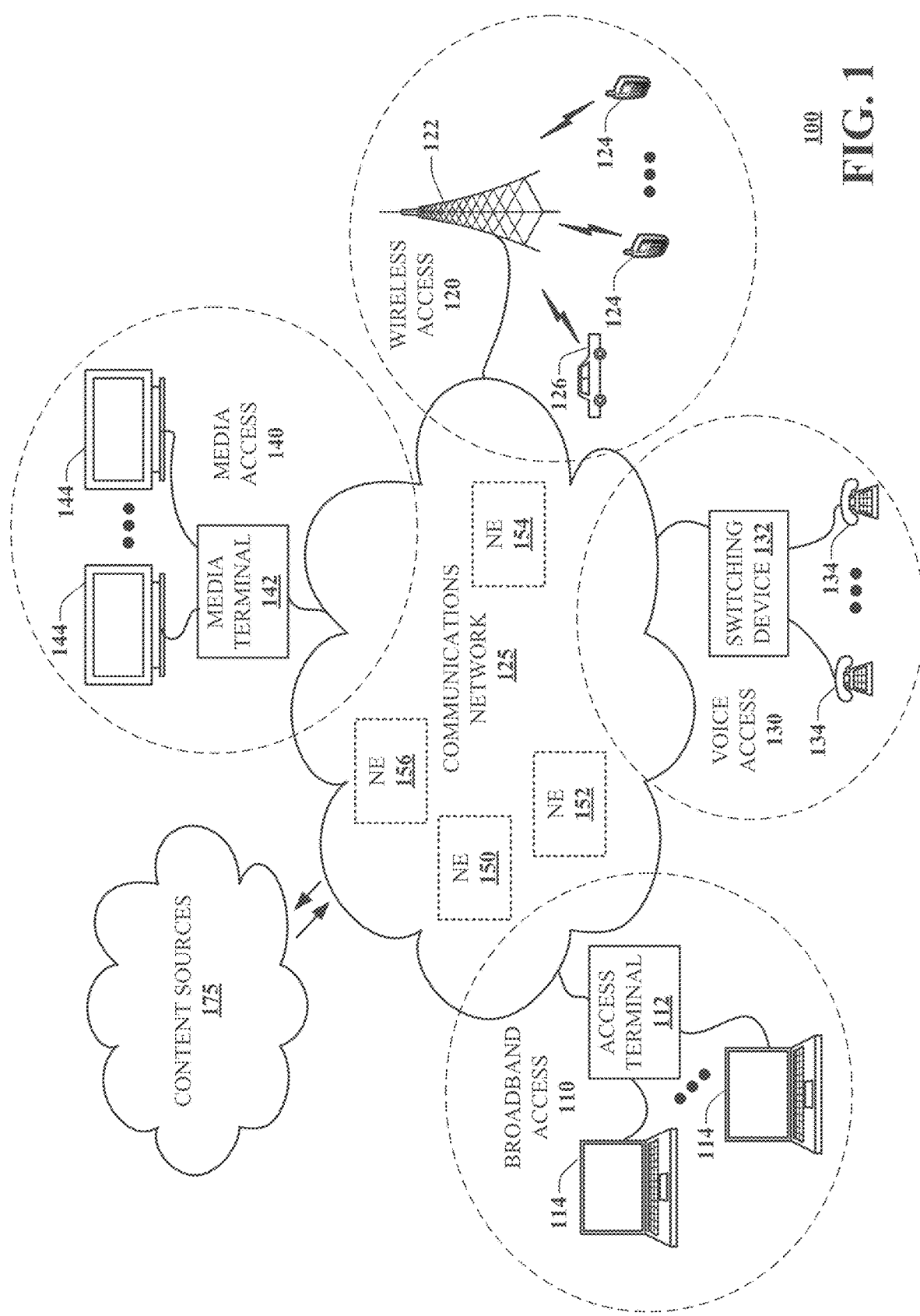
FIG. 1 is a block diagram illustrating an example, non-limiting embodiment of a communication network in accordance with various aspects described herein.

Referring now to FIG. 1, a block diagram is shown illustrating an example, non-limiting embodiment of a communication network 100 in accordance with various aspects described herein. For example, communication network 100 can facilitate in whole or in part providing streaming data to one or more client devices. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Reference will now be made to a methodology and testbed according to an embodiment. For the evaluation described herein, a combination of experiments and simulations were used. Simulations were used to achieve scale and experiments were used to validate results for scenarios capturing the characteristics of scenarios with different bottleneck links (e.g., server-side, backhaul network, last-hop), access technologies (e.g., WiFi or LTE), bandwidth variations (e.g., using competing players, or real-world traces), video encodings (e.g., use of different videos), and players (e.g., instrumentation and experiments using both OSMF and dash.js). Through evaluation across a wide range of scenarios and technologies, it is shown that the conclusions are applicable.

Figure 2A:
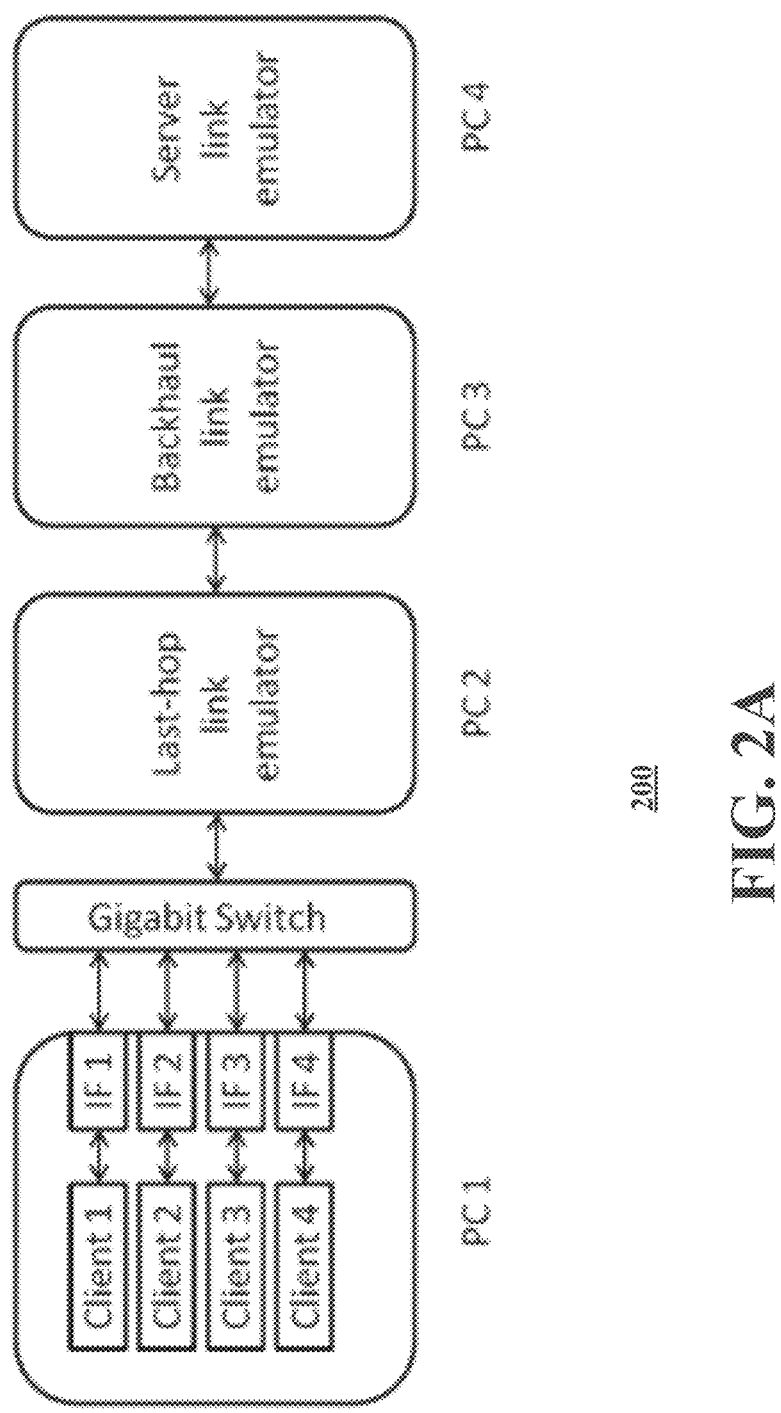
FIG. 2A depicts an overview of an experimental testbed according to an embodiment.

Still referring to the methodology and testbed, reference will now be made in particular to an experimental testbed. To capture the characteristics of different links and access technologies along the end-to-end delivery path, an experimental testbed 200 was set up consisting of four workstations. Referring to FIG. 2A, PC 1 hosts four competing streaming clients and the other three machines (PCs 2, 3, and 4) are responsible for emulating the network conditions in each part of the delivery path. Dummynet ([10] M. Carbone and L. Rizzo, "Dummynet revisited," ACM SIGCOMM Computer Communication Review, vol. 40, pp. 12-20, 2010) is used to emulate the link characteristics (e.g., bandwidth, packet delay and loss) at each link. Each PC is configured to reside in a different IP subnet.

PC 4 runs the video server, and emulates the path properties along the links connecting the server to the operator's network. PC 3 emulates the backhaul link of the operator and implements per-client rate caps. PC 2 emulates the last-hop. To capture some key differences in modern access technologies, different scheduling policies are applied at this link. A FIFO queue is used to capture the behavior of most home WiFi routers. Individual queues for each client are used to capture the implementation by a typical LTE base station (eNodeB).

Finally, PC 1 is configured with four gigabit Ethernet cards, 8 gigabytes of RAM, and a quad-core Intel Xeon CPU. The IP Network Namespaces (ip-netns) package is used to associate each interface with its own logical namespace and run HAS clients on top of these namespaces. This allows having multiple non-interfering client instances residing in a single machine. To avoid interfering with experiments, additional interfaces are used for administrative and logging purposes.

Still referring to the experimental testbed, reference will now be made in particular to clients and servers: Two open-source players are used: OpenSource Media Framework (OSMF) [see, http://www.adobe.com/devnet/video/articles/osmfoverview.html] and dash.js [see, https://github-.com/Dash-Industry-Forum/dash.js/wiki], to show broader applicability of the framework according to an embodiment. The dash.js source code is used in its unmodified form (implementing a hybrid of BOLA ([11] K. Spiteri, R. Urgaonkar, and R. K. Sitaraman, "BOLA: near-optimal bitrate adaptation for online videos," in Proc. IEEE INFOCOM, 2016) and rate-based adaptation). In contrast, motivated by prior research suggesting the use of larger buffers, the OSMF player was set to use min/max buffer thresholds of 30/40 seconds. As a proof of concept implementation, the OSMF player was modified to share information with the network and implement various optimized boost-aware adaptation algorithms of various embodiments.

In the OSMF setup, Adobe Media Server is run and the client code is modified to log parameters of interest to file. While experiments are run with different videos, the default one is 10 minutes long and is available in the following average encoding bitrates: 144, 268, 625, 1124, 2217, 4198 kbit/s. Since dash.js uses a client-side JavaScript implementation, it has limited access to the client's file system. To collect client-side metrics, the web browser was instrumented and metrics exported to an external database.

Still referring to the experimental testbed, reference will now be made in particular to certain limitations: The WiFi and LTE scenarios do not capture all differences between WiFi and LTE seen in practice. For example, this testbed did not emulate details associated with heterogeneous and time varying signal-to-noise (SNR) ratios, and how this can impact scheduling in LTE. Rather than trying to capture the low-level details of the physical environment this testbed emulated the bandwidth conditions of the clients using real bandwidth traces and differentiated the scenarios based on how queuing is done at the last hop (single FIFO queue for WiFi and individual queues for the LTE-based scenario). It is believed that the trace-based per-client throughput and simplified edge abstraction allows for a reasonable comparison of the impact of using per-client rate caps on application-level performance.

Still referring to the methodology and testbed, reference will now be made in particular to a simulation setup. Developed was a simulator in C++ that captures the clients' rate adaptation, bandwidth variations, individual caps, temporary boosting, and boost-aware client-side policies. In this simulation setup, multiclient scenarios assume a shared bottleneck link and use max-min fairness at all times, taking into account each client's individual cap and whether each client is currently active or not (based on the on-off periods of chunk-based delivery). The default bitrate adaptation logic is kept simple. Each client uses an Exponentially Weighted Moving Average (EWMA) with $\alpha=0.4$ to compute a historic per-chunk throughput estimate. The client then selects the highest available encoding below 80% of this estimate. Buffer thresholds are selected and used to make the same decisions that the OSMF player would make.

Still referring to the simulation setup, reference will now be made in particular to certain bandwidth and chunk-size variations: For many of the experiments (both with testbed and simulator) competing clients generate most of the bandwidth variations. However, also performed were experiments where varied was the bandwidth available for a client based on traces. In these cases, the clients' maximum available bandwidth is equal to the minimum of (i) their individual rate cap and (ii) the bandwidth value in the trace. For the experiments, this value is then used to constrain each client's maximum rate, while for the simulations, this value is used to calculate each clients (fair) bandwidth share. The chunk-size variability within each video associated with Variable BitRate (VBR) encoding can cause chunk downloads to take longer than expected. To capture that not all chunks are the same size (despite having the same playback duration and encoding quality), extracted were the chunk sizes of 50 random YouTube videos and used were the obtained chunk-size sequences (one for each quality level and video) in the simulations.

Reference will now be made to impact of a fixed rate cap according to an embodiment. This section highlights the main benefits, drawbacks, and tradeoffs when using a fixed rate cap. Throughout the section the clients are not modified; only considered are the impact of fixed caps.

Figure 2B:
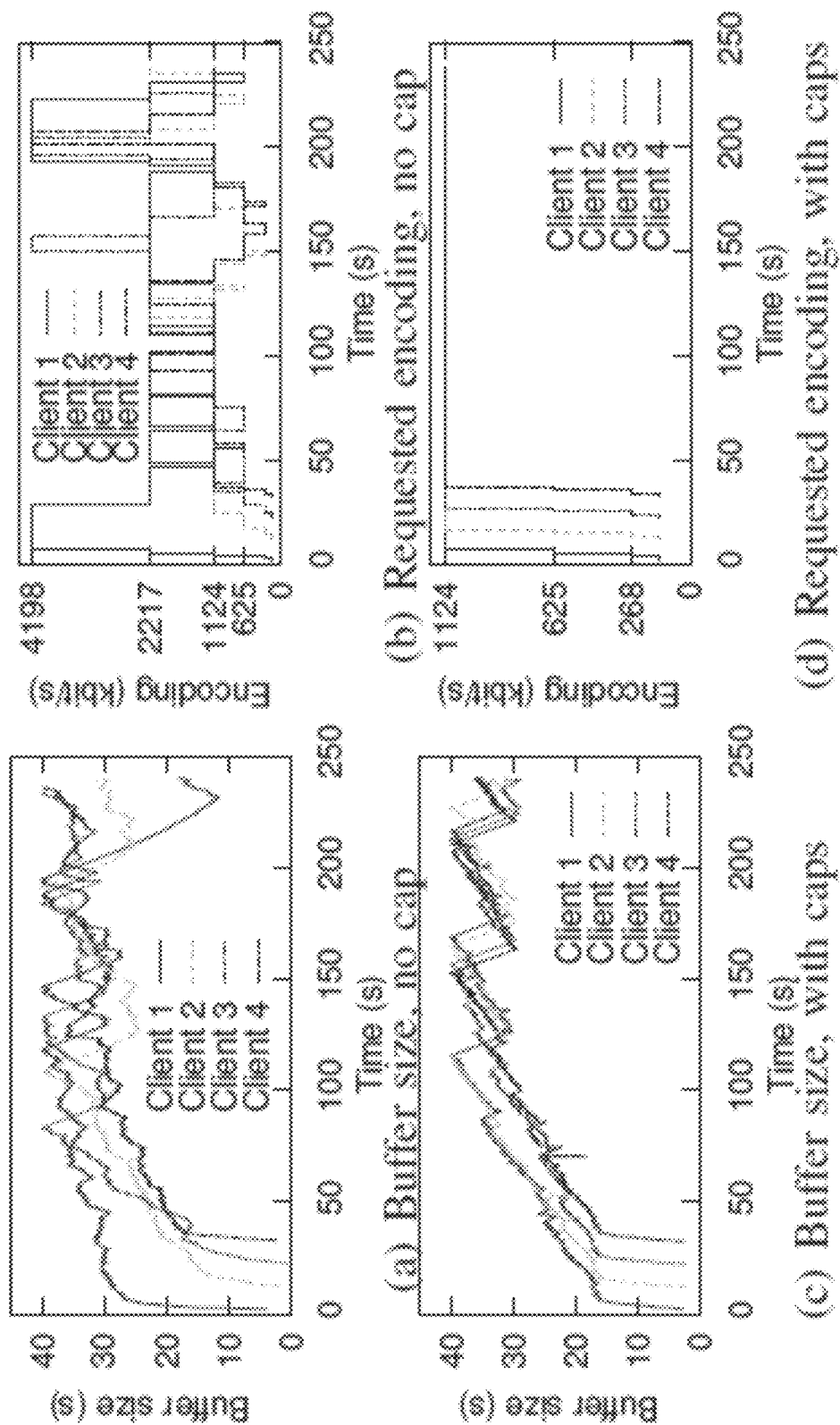
FIG. 2B depicts examples with four competing OSMF clients (shown in panels a-d) according to various embodiments.
Figure 2C:
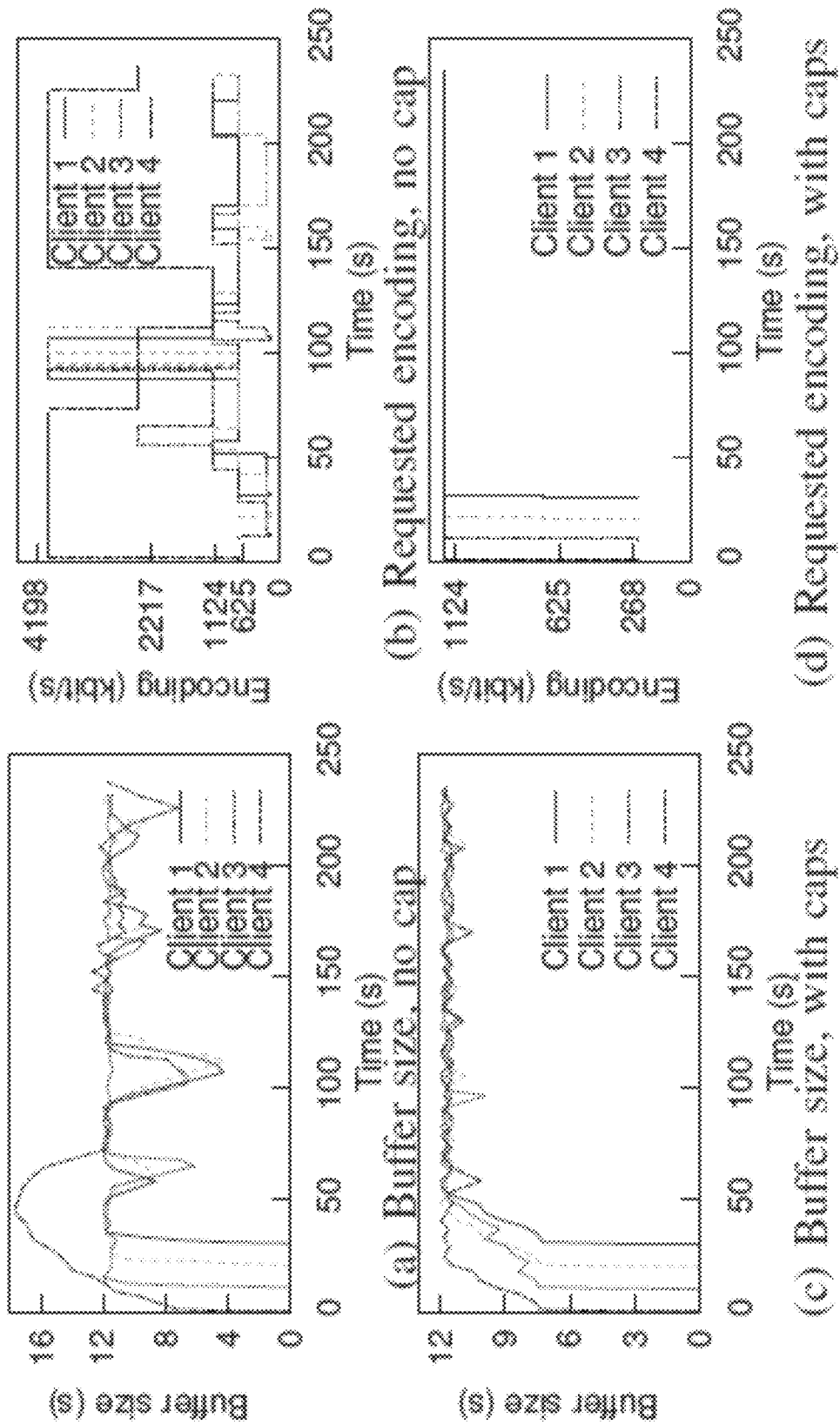
FIG. 2C depicts examples with four competing DASH.js clients (shown in panels a-d) according to various embodiments.

Still referring to the impact of a fixed rate cap, reference will now be made in particular to certain experimental scenarios: benefits and drawbacks. FIGS. 2B and 2C show example results with four competing OSMF and dash.js players, respectively. In both cases, the top row (panels a and b) shows results for the no-cap case and the bottom row (panels c and d) shows results with a fixed cap. Furthermore, panels (a) and (c) show the buffer occupancy over time, while panels (b) and (d) show the encoding rate of the played video chunks. In these experiments, clients share a 6000 kbit/s bottleneck, and start times of sessions are staggered by 10 seconds. Compared are cases without caps and with individual caps of 1500 kbit/s (on the backhaul link). This cap corresponds to the equal share of bandwidth that each client would theoretically obtain using TCP.

Still referring to the experimental scenarios: benefits and drawbacks, reference will now be made in particular to certain performance benefits of caps: Several positive observations stand out. First, the use of individual caps improves playback stability. Requested bitrates highly fluctuate in the no-cap case. In contrast, the capped clients quickly reach a stable playback quality and use this quality steadily throughout the playback session. Variations like in the no-cap cases can have significant negative impact on QoE ([1] F. Dobrian, V. Sekar, A. Awan, I. Stoica, D. Joseph, A. Ganjam, J. Zhan, and H. Zhang, "Understanding the impact of video quality on user engagement," in Proc. ACM SIGCOMM, 2011; [2] S. Krishnan and R. Sitaraman, "Video stream quality impacts viewer behavior: Inferring causality using quasi-experimental designs," in Proc. IMC, 2012; [3] T. Huang, N. Handigol, B. Heller, N. McKeown, and R. Johari, "Confused, timid, and unstable: Picking a video streaming rate is hard," in Proc. ACM IMC, 2012), and have previously been reported by others ([7] S. Akhshabi, L. Anantakrishnan, C. Dovrolis, and A. C. Begen, "Serverbased traffic shaping for stabilizing oscillating adaptive streaming players," in Proc. ACM NOSSDAV, 2013]; [12] R. Houdaille and S. Gouache, "Shaping http adaptive streams for a better user experience," in Proc. ACM MMSys, 2012).

Consequently, the buffer conditions are more stable, as clients do not try to fetch unsustainable encodings, and the need to buffer more video is alleviated. The larger initial buffer size of the first arriving dash.js client (see FIG. 2C, panel a) can be explained by lack of competition and the way the unmodified dash.js client uses throughput measurements for dynamic buffer sizing. When throughput is high, the player aims for a larger target buffer occupancy approximately 40 seconds, while when the throughput is lower the target is 12 seconds. Here, the first client initially aims for the larger target, but must fall back to the smaller target once other clients start playback.

Second, the use of individual caps improves fairness among competing clients. For example, the first arriving client in the non-capped case unfairly obtains higher throughput and encoding quality than the other clients (e.g., more of the session at highest quality, as seen in FIG. 2C panel b). This type of unfairness among competing HAS players is known [[3] T. Huang, N. Handigol, B. Heller, N. McKeown, and R. Johari, "Confused, timid, and unstable: Picking a video streaming rate is hard," in Proc. ACM IMC, 2012], [[13] A. Rao, A. Legout, Y. Lim, D. Towsley, C. Barakat, and W. Dabbous, "Network characteristics of video streaming traffic," in Proc. ACM CoNEXT, 2011), and is due to one client starting out with a larger bandwidth share combined with the conservativeness of TCP and HAS adaptation. This has a compounding (negative) effect for clients that start with the smaller bandwidth share.

Figure 2D:
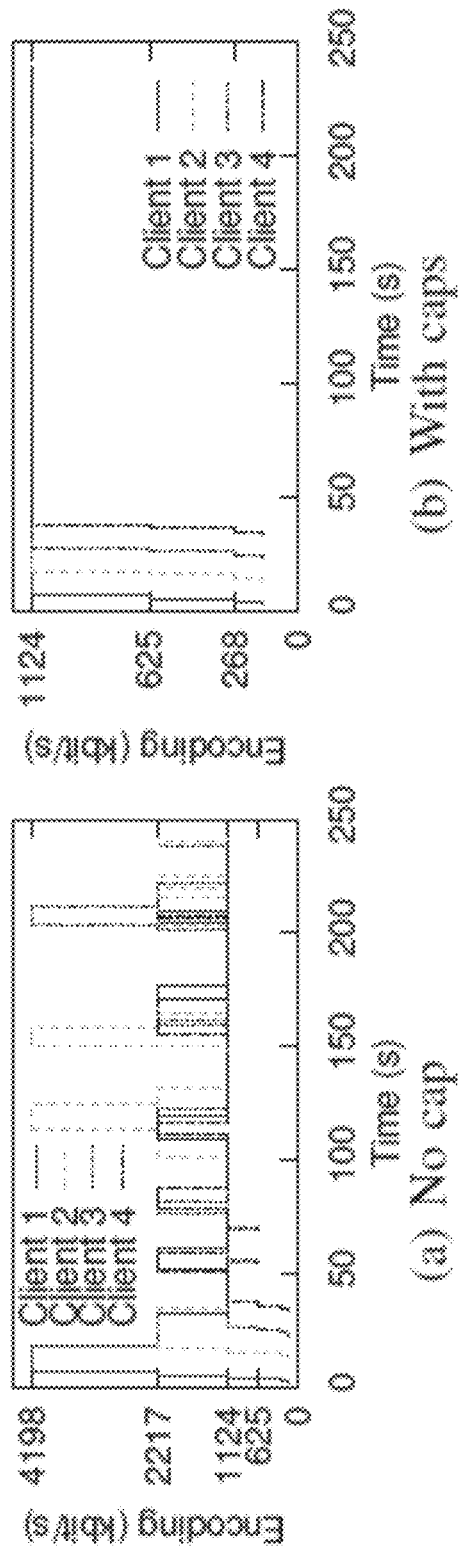
FIG. 2D depicts examples of encoding rates in LTE-based scenario (OSMF) (shown in panels a-b) according to various embodiments.
Figure 2E:
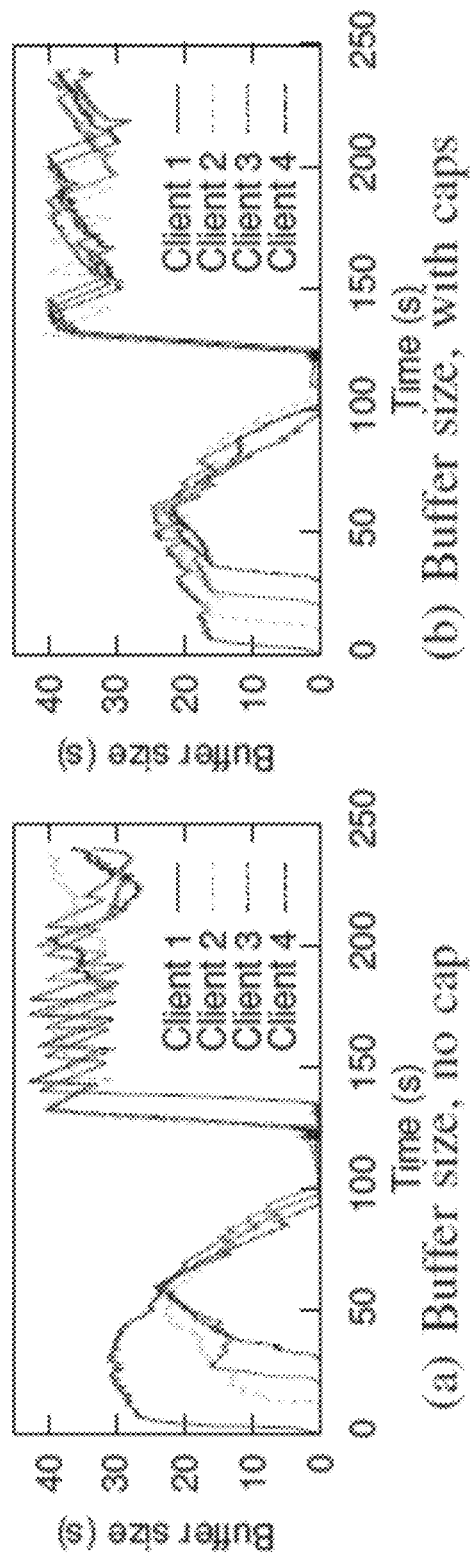
FIG. 2E depicts example scenarios with stalls (shown in panels a-b) according to various embodiments.

Third, without caps, bandwidth variations cause a lot of wasted user data and bandwidth on downloading encodings well above clients' fair share (1500 kbit/s) or utility threshold. This is often observed in mobile clients with small screen sizes, whose utility starts to diminish with encoding rates above 1000 kbit/s (c.f. FIG. 2G and [[14] D. D. Vleeschauwer, H. Viswanathan, A. Beck, S. Benno, G. Li, and R. Miller, "Optimization of http adaptive streaming over mobile cellular networks," in Proc. IEEE INFOCOM, 2013]).

It is concluded that with caps, stability in playback quality and buffer conditions combined with fairness improves overall user QoE. Even when bandwidth is equally shared among non-capped clients, instability causes them to play more poor quality chunks, reducing their utility. For example, in the noncapped case 23.2% of the chunks have encodings below 1124 kbit/s, compared to 6.25% with the 1500 kbit/s cap.

The above observations also hold true for other scenarios. FIG. 2D shows the encoding levels observed for the corresponding LTE-based scenario, when using OSMF. The buffer conditions (omitted) are very similar in the WiFi case.

Fourth, caps can reduce stall occurrences and (sometimes) stall durations. While (as intuition suggests) the use of caps extends the minimum time over which clients can recover from a specific stall event, it has been found that use of individual caps also can help reduce stalls. One reason is that the high variability in both encodings and buffer occupancy for noncapped clients increases their likelihood to stall in the first place. Then, stalls that occur when a client downloads a large chunk (encoded at a high rate) often takes longer to recover from. This problem is illustrated by the first arriving client ("client 1") in FIG. 2E, panel (a), who stalls for a longer period than other clients due to downloading a higher-quality chunk at the time of the stall. In this example scenario, forced was a stall by temporarily reducing the bottleneck capacity to 100 kbit/s between 60-120 seconds (instead of the default 6000 kbit/s), and the clients do not try to abort and replace the stalled chunk download with a lower quality download.

Still referring to the experimental scenarios: benefits and drawbacks, reference will now be made in particular to certain performance drawbacks of caps: The primary drawbacks of fixed caps are increased startup times and slower stall recovery, caused by reduced peak download rates. A focus was on startup times and it is noted that the startup times provide insights into the stall recovery times after outages or when replacing stalled chunk downloads with lower encoding downloads.

Table I below shows the average increase in startup times when using fixed caps compared to the non-capped case. Again used were four competing clients with a shared server-side bottleneck of 6000 or 12000 kbit/s, and an individual cap of 1500 kbit/s. To understand the impact of competition, arrivals were staggered by 20 seconds and reported were the average startup times for each client over 10 runs. Results are shown both for the unmodified OSMF client and when using a pre-determined encoding quality for the initial chunk. In both cases, the player starts playback in a default fashion, after having obtained the first chunk (with a four second playback duration). Some players use a manifest-specified encoding to start (e.g., HLS), while some decide based on pre-set initial bandwidth (e.g. ExoPlayer). There is also an option to maintain history of previous sessions to drive this decision.

TABLE I

RELATIVE INCREASE IN STARTUP TIMES WITH CAP.

|  |  |  | Client arrival | | | |
| --- | --- | --- | --- | --- | --- | --- |
|  |  | Encoding | First | Second | Third | Fourth |
| Shared bottleneck | 600 kbit/s | Unmodified | +26.4% | +30.8% | +13.2% | +27.4% |
|  |  | 144 kbit/s | +21.1% | +23.0% | +27.1% | +25.9% |
|  |  | 268 kbit/s | +33.9% | +36.0% | +18.9% | +32.9% |
|  |  | 625 kbit/s | +92.0% | +80.6% | +5.5% | +52.7% |
|  |  | 1124 kbit/s | +130.5% | +84.5% | +113.3% | +51.7% |
|  | 12000 kbit/s | Unmodified | +20.6% | +20.5% | +17.5% | +19.0% |
|  |  | 144 kbit/s | +21.5% | +21.8% | +19.5% | +14.6% |

TABLE I-continued

RELATIVE INCREASE IN STARTUP TIMES WITH CAP.

| | Client arrival | | | |
|---|---|---|---|---|
| Encoding | First | Second | Third | Fourth |
| 268 kbit/s | +33.5% | +32.5% | +27.8% | +34.5% |
| 625 kbit/s | +96.0% | +92.6% | +77.2% | +85.0% |
| 1124 kbit/s | +190.1% | +184.9% | +112.6% | +111.5% |

Results for the first arriving client in Table I show the base increase in startup delay for capped clients that have no competition. The main insight is that even medium initial bitrate of 625 kbit/s can experience near doubling of startup time. Attempting higher encoding results in further significant increase. The unmodified client fares much better due to its conservative initial selection. Note that overall increases in startup time are not as high as it might be theoretically expected. This can be explained by the combination of TCP dynamics (not all clients reaching their fair share quickly) and the ON-OFF nature of HAS allowing for a new client (often 4th) to join when an existing client is in the OFF phase.

Still referring to the impact of a fixed rate cap, reference will now be made in particular to certain impact of fixed vs. fair-share caps. Next examined are the quantitative impact of two example cap policies and a no-cap baseline on the observed benefits:

Fair-share cap: Given m clients, each client has an individual cap equal to $1/m^{th}$ of the bottleneck bandwidth.
Fixed cap: Each client is given an individual cap equal to 1500 kbit/s, regardless of the bottleneck bandwidth.
No cap: There are no individual caps.

While variations of these policies can be implemented in networks, here they are used to study the impact of selecting different sized caps. For example, with m=4, when the shared bottleneck is smaller (larger) than 6000 kbit/s, the fixed cap of 1500 kbit/s is above (below) the fair share. Similarly, when the shared bottleneck is smaller (larger) than 6000 kbit/s, the fair-share cap is below (above) 1500 kbit/s.

The fair-share cap policy avoids bandwidth waste on downloading chunks of higher than sustainable encoding rates when clients share bandwidth fairly. This bandwidth is better used to reduce the number of poor quality chunks and to maintain stability. Motivated by this observation, introduced is the wasted fair-share volume metric, which measures the fraction of bytes delivered at encoding rate higher than the fair-share.

The fixed cap policy is motivated by the diminishing utility observed by small screen clients (e.g., mobile phones) with encodings above 1000 kbit/s (e.g., see FIG. 2G and [[14] D. D. Vleeschauwer, H. Viswanathan, A. Beck, S. Benno, G. Li, and R. Miller, "Optimization of http adaptive streaming over mobile cellular networks," in Proc. IEEE INFOCOM, 2013]). Motivated by this limitation of the human eye, also introduced is the wasted small-screen volume metric, which measures the fraction of bytes delivered with encodings above 1500 kbit/s.

Figure 2F:
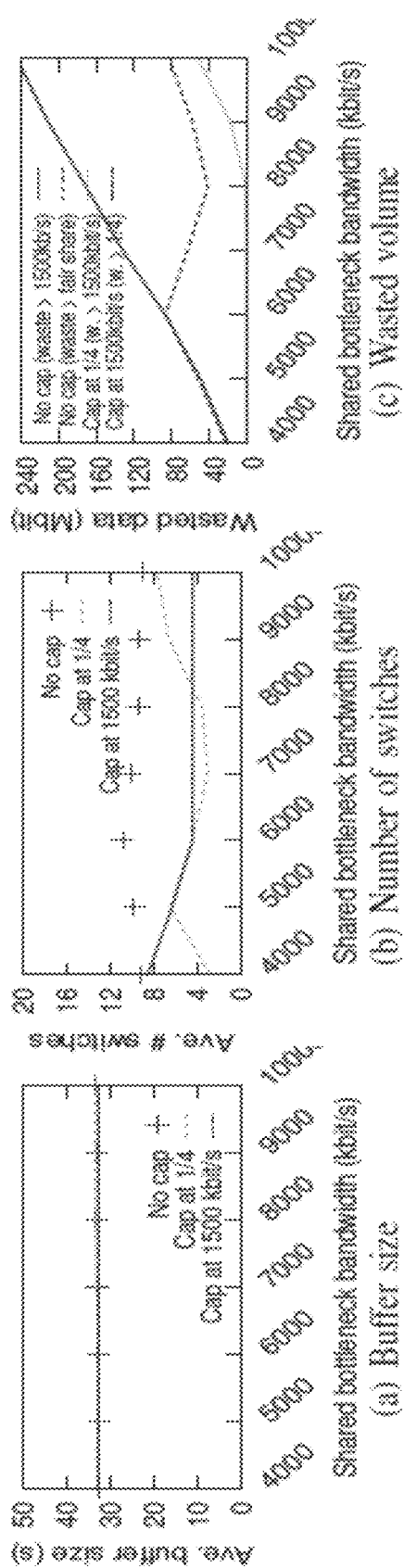
FIG. 2F depicts comparison of playback metrics with different rate cap policies (shown in panels a-c) according to various embodiments.
Figure 2G:
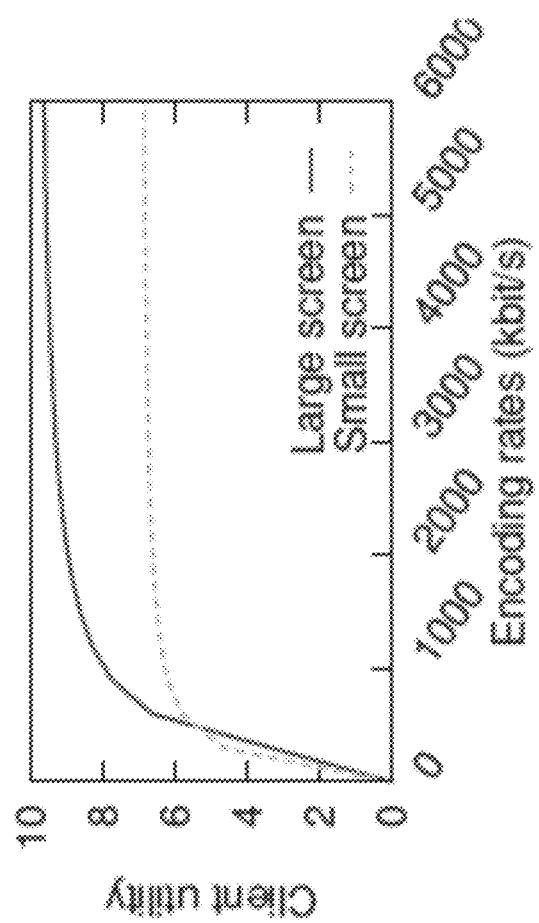
FIG. 2G depicts client utility functions for different screen sizes (using utility functions from [[14] D. D. Vleeschauwer, H. Viswanathan, A. Beck, S. Benno, G. Li, and R. Miller, "Optimization of http adaptive streaming over mobile cellular networks," in Proc. IEEE INFOCOM, 2013]).

FIG. 2F shows the average buffer size (panel a), number of switches (panel b), wasted fair-share and small-screen volume (panel c), across different bandwidth levels. The results represent averages over 50 simulation runs (each with different videos). Note that the fair-share cap and fixed cap are identical when the shared bottleneck is 6000 kbit/s. On the left-hand-side of this point, the fair share is more restrictive and on the right-hand-side, the fixed cap is more restrictive.

To maintain similar average buffers across policies and conditions (FIG. 2F (panel a)), the capped clients require significantly fewer encoding switches (FIG. 2F (panel b)) and the number of switches is typically the lowest for the more restrictive of the two policies. Again, the use of caps helps improve stability. The lack of cap (i.e., no cap policy curves) can result in a lot of wasted bandwidth (FIG. 2F (panel c)). Note that these values are conservative. For example, in the default case (with 6000 kbit/s), computed is a 22.1% saving if all chunks with encodings higher than 1500 kbit/s instead were to be delivered using 1500 kbit/s encodings. This corresponds to the wasted data. However, in the test case, the highest encoding rate below 1500 kbit/s is 1124 kbit/s. Taking this into account, in practice, 30.2% of the bandwidth could actually have been saved if simply selecting these chunks at the 1124 kbit/s encoding. To put the savings into further perspective, note that the chunks encoded at rates larger than the fair share (here, equal to 1500 kbit/s) make up 54.2% of the total delivered data.

Figure 2H:
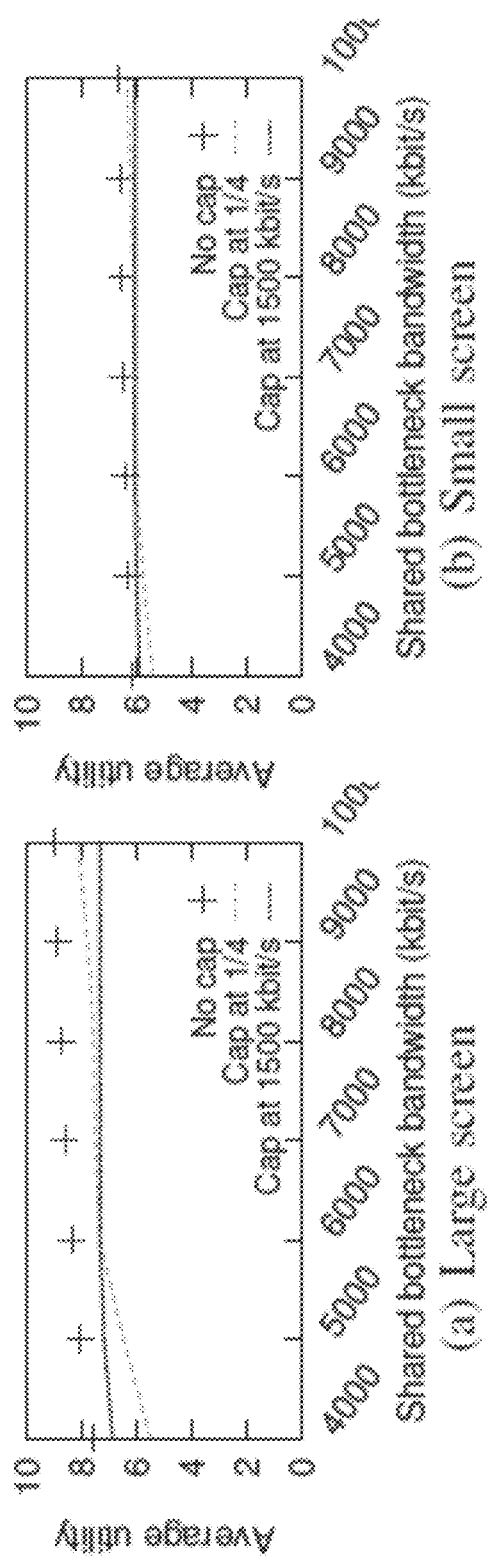
FIG. 2H depicts rate-based (only) utility for different screen sizes (shown in panels a-b) according to various embodiments.

When discussing users' QoE, multiple dimensions must be taken into account, including: (i) stall metrics such as stall occurrences and durations, (ii) playback utility metrics based on encoding rates of individual chunks, and (iii) playback quality fluctuations. In the above experiments stalls were not observed, and since thus far in the discussion the primary focus has been on (i) and (iii), now attention is turned to (ii). When discussing playback utility, each chunk is associated with an individual utility, using the utility function proposed by Vleeschauwer et al. ([14] D. D. Vleeschauwer, H. Viswanathan, A. Beck, S. Benno, G. Li, and R. Miller, "Optimization of http adaptive streaming over mobile cellular\ networks," in Proc. IEEE INFOCOM, 2013]):

$$f(q)=\beta((q/\theta)^{1-\alpha}-1)/(1-\alpha), \quad (1)$$

where $\alpha>1$, $\beta>0$ and $\theta>0$ are screen dependent parameters. FIG. 2G shows the example utility functions used in the evaluation for (i) small screen clients ($\alpha=2$, $\beta=7$, $\theta=0.1$ Mbps), and (ii) large screen clients ($\alpha=2$, $\beta=10$, $\theta=0.2$ Mbps). Clearly, there are diminishing returns to downloading higher encoding rates q, and low encoding rates should be avoided to maintain a high minimum utility. Again, caps help significantly here, as (indirectly) implied by fewer encoding switches (FIG. 2F (panel b) and less wasted data (FIG. 2F panel c)). Another way to measure the encoding-related utility is the average utility across all played chunks (ignoring encoding switches), shown in FIG. 2H. In general, the encoding-related utility differences between the policies are small, especially for the small screen case, and in practice, these small utility gains are typically substantially outweighed by the added benefits observed by capped clients.

Still referring to the impact of a fixed rate cap, reference will now be made in particular to certain impact of cap location. Also evaluated was the use of fixed caps at different bottleneck links using the experimental testbed as well as the simulations. While these results are omitted herein, it was found that (i) the impact of the cap location is relatively minor, and (ii) the simulation results align well with the testbed experiments, despite not capturing all the subtleties of TCP behavior, and therefore resulting in less extreme instabilities and unfairness for the non-capped clients.

Still referring to the impact of a fixed rate cap, reference will now be made in particular to certain real-world LTE experiments. Validated is the data saving and stability on real commercial apps, from two VoD and two Live services, by capping per-client throughput at 1500 kbit/s. Four mobile devices (Samsung J7 running Android 7.0) are set up to use a Squid proxy over a cellular LTE network. The clients are started staggered 10-20 seconds, and then restarted periodically to create more startup measurements. The proxy applies the individual rate caps, limits the overall link capacity at 6 Mbit/s, and collects traces of the devices' HTTP traffic. Metrics for startup times, bitrates, and rebuffer ratios are extracted as outlined by Mangla et al. ([15] T. Mangla, E. Halepovic, R. Jana, K. Hwang, M. Platania, M. Ammar, and E. Zegura, "Videonoc: Assessing video qoe for network operators using passive measurements," in Proc. MMSys, 2018). All apps use HLS with audio and video muxed into the same stream, but use different bitrates and chunk durations. Live1 is a major TV channel, Live2 is a major TV broadcaster, VoD1 is a major sports channel, and VoD2 is a major TV broadcaster. Table II below summarizes these results.

TABLE II

REAL-WORLD MEASUREMENTS WITH AND WITHOUT CAPS.

| Service | Cap vs. no cap | Play time | Ave. bitrate | Switches /min | Startup time | Stalls | Rebuff. ratio |
|---|---|---|---|---|---|---|---|
| Live1 | No cap | 6,744 | 1,347 | 0.28 | 7.1 | 0.50 | 0.54% |
|  | Capped | 3,944 | 982 | 0.28 | 7.9 | 0.00 | 0.00% |
| Live2 | No cap | 2,640 | 1,055 | 1.17 | 7.6 | 1.00 | 3.36% |
|  | Capped | 3,310 | 843 | 0.04 | 13.4 | 0.22 | 0.46% |
| VoD1 | No cap | 5,150 | 1,170 | 0.58 | 23.3 | 1.24 | 4.94% |
|  | Capped | 4,920 | 1,061 | 0.16 | 27.8 | 0.14 | 0.43% |
| VoD2 | No cap | 9,300 | 1,192 | 0.19 | 4.8 | 0.69 | 0.49% |
|  | Capped | 10,716 | 812 | 0.13 | 4.6 | 1.11 | 0.51% |

It is found that the cap prevents higher bitrates (above 1500 kbit/s) from being delivered, as expected. This yields savings of 9-32% on data compared to the un-capped case with 6 Mbit/s. By removing the highest bitrates and competition between players, switching improves by 33-97% for three of the services (with one service increasing the switching by 2.5%). This qualitatively confirms the testbed findings on data savings and stability. Furthermore, for the three services with substantial stability improvements, the cap reduces the number of stalls by 78-100% and the rebuffering ratio by 86-100%, at the expense of increased startup times (by 11-77%).

Large-scale benefits of rate caps on data savings can also be derived from recent work ([15] T. Mangla, E. Halepovic, R. Jana, K. Hwang, M. Platania, M. Ammar, and E. Zegura, "Videonoc: Assessing video qoe for network operators using passive measurements," in Proc. MMSys, 2018), using the observation that some video services internally cap bitrates delivered to clients, while others do not. Services that cap bitrates on a cellular network can have up to 50% lower bandwidth usage ([15] T. Mangla, E. Halepovic, R. Jana, K. Hwang, M. Platania, M. Ammar, and E. Zegura, "Videonoc: Assessing video qoe for network operators using passive measurements," in Proc. MMSys, 2018), without losing the visual quality on small screens ([14] D. D. Vleeschauwer, H. Viswanathan, A. Beck, S. Benno, G. Li, and R. Miller, "Optimization of http adaptive streaming over mobile cellular networks," in Proc. IEEE INFOCOM, 2013).

Reference will now be made to bandwidth boosting according to an embodiment. Thus far, it has been shown that rate caps come with several benefits (e.g., improved stability, fairness, less wasted bandwidth, sometimes fewer and shorter stalls), but also some drawbacks (e.g., increased startup times and slower stall recovery). To address these drawbacks while further reducing stall occurrences, introduced herein are two mechanisms: (i) temporary boosting, and (ii) boost-aware client-side rate adaptation (boost-aware adaptation). The idea of temporary boosting is as follows. When a client starts viewing a video or otherwise drains its buffer, the network temporarily increases its individual cap. The boost-aware adaptation modifies the player's encoding selections to optimize the use of extra bandwidth during the boost period. Together, these mechanisms help reduce startup times, improve stall recovery times, and provide healthier buffer conditions (through faster buffer fill), effectively also improving the protection against stalls.

Still referring to the bandwidth boosting, reference will now be made in particular to certain information sharing vs. inference. For efficient implementation of the above mechanisms the client and network need to share (or in other ways extract) information regarding buffer conditions and boost periods so that (i) the network can determine appropriate times and magnitudes to boost clients, and (ii) the clients have the necessary information to optimize use of this extra bandwidth.

One embodiment relates to player-to-network sharing: In a specific implementation of this embodiment, to correctly apply boosting, the network needs to "know" when clients have low buffers. Ideally, clients would share this information with the network using existing ([16] "ISO/IEC FDIS 23009-5:2017: Information Technology Dynamic adaptive streaming over HTTP (DASH)—Part 5: Server and network assisted DASH (SAND)," 2017] or custom-made protocols. Using BUFFEST ([17] V. Krishnamoorthi, N. Carlsson, E. Halepovic, and E. Petajan, "Buffest: Predicting buffer conditions and real-time requirements of http(s) adaptive streaming clients," in Proc. ACM MMSys, 2017) and similar systems ([18] T. Mangla, E. Halepovic, M. Ammar, and E. Zegura, "MIMIC: Using passive network measurements to estimate HTTP-based adaptive video QoE metrics," in Proc. IEEE/IFIP TMA, 2017; [19] P. Casas, M. Seufert, and R. Schatz, "YOUQMON: A system for online monitoring of YouTube QoE in operational 3G networks," ACM SIGMETRICS Perform. Eval. Rev., vol. 41, pp. 44-46, 2013; [20] G. Dimopoulos, I. Leontiadis, P. Barlet-Ros, and K. Papagiannaki, "Measuring video QoE from encrypted traffic," in Proc. IMC, 2016; [21] T. Wu, S. Petrangeli, R. Huysegems, T. Bostoen, and F. D. Turck, "Network-based video freeze detection and prediction in HTTP adaptive streaming," Comp. Comm., vol. 99, pp. 37-47, 2017), this information can also be inferred from network traffic, even when encrypted, with reduced but acceptable accuracy. These systems can extract low-buffer signals on their own or verify the signals submitted by players claiming low buffers.

Another embodiment relates to network-to-player sharing: Clients can benefit substantially from information that the network can provide. For example, without knowing their individual caps, clients may download encodings higher than their regular caps (during boost periods), hurting long-term performance. Naturally, any protocol that allows the network to communicate with clients can be extended to include this information. In an example implementation of boost-aware adaptation (discussed in more detail below), it is assumed that the network explicitly notifies clients about when, by how much, and for how long they are boosted. Also note that HAS clients are in fact well-equipped to recognize caps and boost periods via their historical throughput measurements, especially if they are consistently applied. Next evaluated are potential benefits of boosting with different levels of cooperation.

Still referring to the bandwidth boosting, reference will now be made in particular to certain client-side behavior with boosting. To take full advantage of the extra bandwidth during boost periods, clients should perform careful encoding selection, leveraging both local information (e.g., "Client" rows in Table III below) and network information, either shared or inferred (e.g., "Network" rows in Table III below).

TABLE III

SUMMARY OF NOTATION AND INFORMATION.

| | Notation | Information |
|---|---|---|
| Client | $B_0$ | Current buffer occupancy |
| | $\overline{B}$ | Maximum buffer threshold |
| | $B^*$ | Target buffer |
| | $Q_l$ | Encoding with quality level l $(1 \leq l \leq L)$ |
| | $q_0$ | Most recently requested chunk's encoding rate |
| | $X$ | Current estimated throughput |
| | $T_c$ | Chunk duration |
| Network | $C$ | Default rate cap |
| | $C^+$ | Boosted rate cap |
| | $\delta$ | Remaining boost duration |

First, the client should limit buffer filling to the maximum buffer threshold $\overline{B}$ (unless still boosted when reaching this threshold). Assuming that the current buffer is $B_0$ and each chunk has a play duration of $T_c$, a bound on the number of Chunks n that the client should aim to download during the remaining boost time $\delta$ can then be calculated as:

$$n \leq (\overline{B} - B_0 + \delta)/T_c. \quad (2)$$

Second, the client should not waste bandwidth on encodings greater than the encoding that the (regular) rate cap allows, Therefore, assuming that the cap is C and the next n chunk requests are enumerated 1 through n, we have:

$$q_i \leq \max_l(Q_l \mid Q_l \leq C), \quad 1 \leq i \leq n. \quad (3)$$

Third, since it is important that clients quickly recover from low buffer conditions and frequent encoding fluctuations should be avoided, it is advantageous to plan for monotonically non-decreasing encodings during the boost period:

$$q_1 \leq q_2 \leq \ldots \leq q_n \leq \max_l(Q_l \mid Q_l \leq C). \quad (4)$$

This allows the clients to quickly build up a buffer safety margin, while also satisfying constraint (3).

Fourth, a client should not plan to exceed the current estimated throughput X (estimated as the boosted cap $C^+$ when no chunk has been downloaded during the boost period) during the remaining boost period $\delta$:

$$\sum_{i=1}^{n} q_i T_c \leq \delta X. \quad (5)$$

Given the above constraints, in the following, described are three candidate policies that a client can apply when selecting the encoding of the next chunk to download.

One candidate policy is greedy fixed quality: The client first determines the largest possible number of chunks n that satisfies constraint (2) and is feasible according to the constraint (5) using some minimum quality $Q_1$. Then, given this n, the client picks the largest possible encoding level l that satisfies constraint (4) and is feasible within the remaining download budget, as determined by constraint (5). The solution to this problem can be computed in $\mathcal{O}(\log(L))$ in using a binary search on feasible n and l, where L is the number of available encodings.

Another candidate policy is maximum encoding quality: Similar to the first policy, first greedily determine the maximum number of chunks to download during the remaining boost duration, which satisfies constraint (2). Second, solve the following optimization problem: maximize $\Sigma_{i=1}^{n} = q_i$, subject to constraints (4) and (5).

Another candidate policy is multi-objective quality: Finally, considered is a more generalized formulation that weighs different objectives into a combined objective function:

$$\text{maximize} \sum_{i=1}^{n} \left( \alpha B_i + (1-\alpha)f(q_i) - \beta \left| f(q_n) - f\left(\max_l Q_l \mid Q_l \leq C\right)\right| \right) - \gamma |B_n - B^*|. \quad (6)$$

Here, $$B_i = B_0 + iT_C - \sum_{j=1}^{i} \frac{q_j T_c}{X}$$

is the estimated (predicted) buffer level after chunk i has been downloaded, and a parameter $\alpha$ is used to weigh the relative importance of maximizing the average buffer size $$\frac{1}{n}\sum_i B_i$$

and the average encoding utility $$\frac{1}{n}\sum_i f(q_i),$$

$f(q_i)$ where is the utility function (1). Parameters $\beta$ and $\gamma$ give more/less (relative) weight to the secondary objectives of ramping up the encodings so to be as close to the ideal steady-state encoding $\max_l(Q_l \mid Q_l \leq C)$, when operating under the cap C, and to fill the buffer near target buffer size $B^*$. In the experiments, this is typically equal to the upper buffer threshold $\bar{B}$ in OSMF, or the average expected buffer in the steady state; i.e., $(\underline{B}+\bar{B})/2$, where $\underline{B}$ is the lower buffer threshold in OSMF.

Figure 2I:
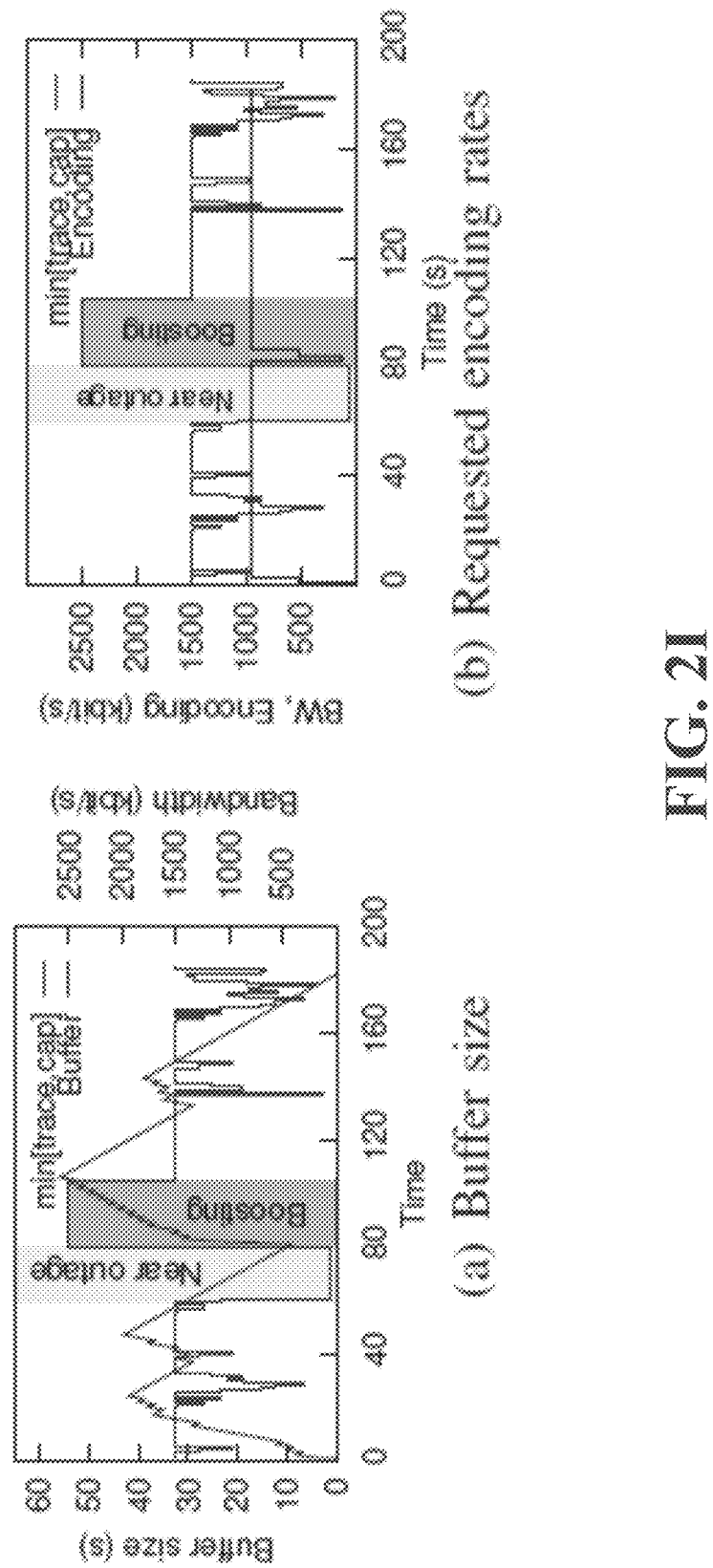
FIG. 2I depicts near-outage examples with client using multi-objective quality (shown in panels a-b) according to various embodiments.

Reference will now be made to experimental evaluation of boosting according to an embodiment. In this regard, reference will now be made in particular to a certain illustrative example of the boosting framework. The above policies have been implemented in OSMF. As the first validation, a simple "near-outage" scenario is used Here, real bandwidth traces [[22] H. Riiser, P. Vigmostad, C. Griwodz, and P. Halvorsen, "Commute path bandwidth traces from 3 g networks: Analysis and applications," in Proc. ACM MMSys, 2013) were used combined with an individual cap of 1500 kbit/s. A 20-second near-outage was added between 60 and 80 seconds, during which the client's cap was set to 50 kbit/s, followed by a δ=25 second boost period, where the individual cap is temporarily increased to $C^+$=2500 kbit/s. FIG. 2I illustrates this scenario for an example client using multi-objective quality. Throughout the evaluation, unless stated otherwise, this policy is run with α=0.5, β=1, γ=1, and $B^*=\bar{B}$. As per design, the client selects encodings such that it quickly refills the buffer and uses increasingly higher encodings, aiming to fill the buffer at the end of the boost period (in this case somewhat overshooting).

Figure 2J:
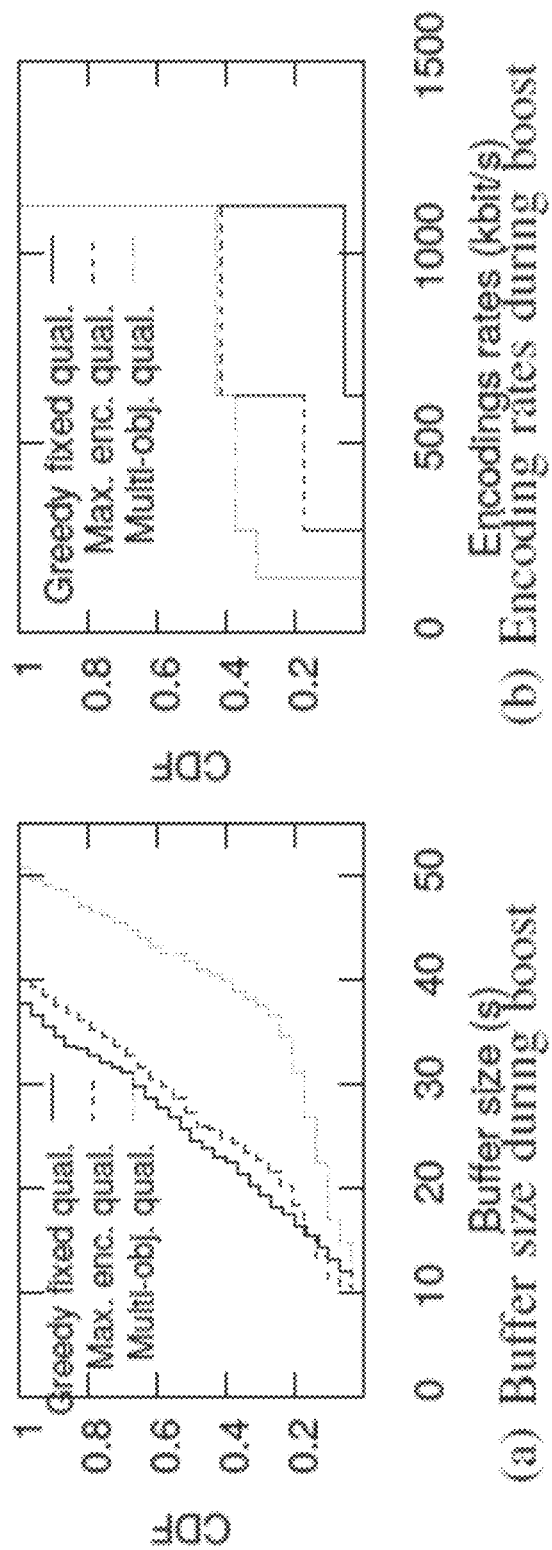
FIG. 2J depicts example comparisons of boost-aware client-side adaptation policies (shown in panels a-b) according to various embodiments.

The three boost-aware policies (as per design) make somewhat different tradeoffs between the buffer size progression during the boost period and the encoding selection. As desired, the multi-objective quality policy is typically the fastest to ramp up the buffer size and therefore spends the least amount of time with a small buffer (e.g., below 10 or 20 seconds). To achieve this, it typically uses lower encodings at the start of the boost period. The other policies prioritize average encodings (in their objective functions) at the expense of slower buffer progression (and hence also lower buffer levels). These relative differences are illustrated in FIG. 2J. Here, shown are the CDFs of the buffer size and selected encodings during the boost period for each of the three policies, as observed over 10 runs using different bandwidth traces (but the same near-outage and boost period as in the original example).

Still referring to the experimental evaluation of boosting, reference will now be made in particular to certain startup improvement with boosting. As desired, boosting improves the video startup times that increased under the fixed cap. Table IV below summarizes the normalized reduction in startup times when using multi-objective quality. Here, four clients with 1500 kbit/s caps start playback staggered by 20 seconds and each client is boosted for 20 seconds during the startup phase.

The normalized reduction in startup times allows for easier comparison to the increases due to fixed caps (shown in Table I above), and is calculated as follows. Take the absolute increase in startup time under a fixed cap for a certain encoding rate of initial chunks (e.g., 144 or 625 kbit/s), and divide it by the startup times in the corresponding non-capped case. With this normalization, a direct comparison can be made between the decreases in Table IV (emphasized with negative signs) with the increases in Table I (emphasized with plus signs). Specifically, the change for boosted clients relative to non-capped clients is equal to the sum of the values extracted from the two tables. For the boost-aware adaptation policies, the initial chunk requests may differ between sessions. Therefore, the 144 kbit/s values provide a pessimistic lower bound on the improvements.

TABLE IV

NORMALIZED RELATIVE STARTUP REDUCTION WITH BOOST.

|  |  | Boost | Client arrival | | | |
|---|---|---|---|---|---|---|
|  |  |  | First | Second | Third | Fourth |
| Shared bottleneck | 6 Mb/s (vs. 625) | +625 kbit/s | −94.8% | −84.8% | −42.4% | −71.9% |
|  |  | +1250 kbit/s | −96.2% | −87.6% | −47.7% | −75.7% |
|  |  | +2500 kbit/s | −102.0% | −90.2% | −46.7% | −78.9% |
|  | 6 Mb/s (vs. 144) | +625 kbit/s | −12.0% | −13.7% | −13.2% | −17.0% |
|  |  | +1250 kbit/s | −13.6% | −16.9% | −22.8% | −22.1% |
|  |  | +2500 kbit/s | −20.2% | −19.9% | −21.0% | −26.4% |
|  | 12 Mb/s (vs. 144) | +625 kbit/s | −11.8% | −13.1% | −9.8% | −5.6% |
|  |  | +1250 kbit/s | −16.4% | −18.2% | −18.0% | −11.5% |
|  |  | +2500 kbit/s | −21.2% | −21.6% | −17.3% | −13.3% |

Overall, it is found that boosting helps recover most of the increase in startup delays, and sometimes even improves over the non-capped case. These results clearly show that boosting can substantially help, even when there is competition (as for the third and fourth arriving clients). For example, with a 625 kbit/s boost and a 6000 kbit/s shared bottleneck, the first and fourth arriving clients see on average a reduction by −94.8% and −71.9%, respectively, compared to the capped clients with 625 kbit/s encoding for the initial chunks. Comparing to average increases of +92.0% and +52.7% with cap, only moderate boosting is needed for the boost-aware system to outperform the non-capped clients. While additional boosting is needed to recover most of the increases for capped clients that always start from 144 kbit/s, a boost magnitude of +2500 kbit/s provides very similar startup times to the corresponding non-capped client. For example, the first and fourth client recover −20.2% of +21.1% and −26.4% of +25.9%, respectively. The LTE and WiFi results are consistent, with LTE experiments having ≈2.9% longer startup times than WiFi, on average.

Figure 2K:
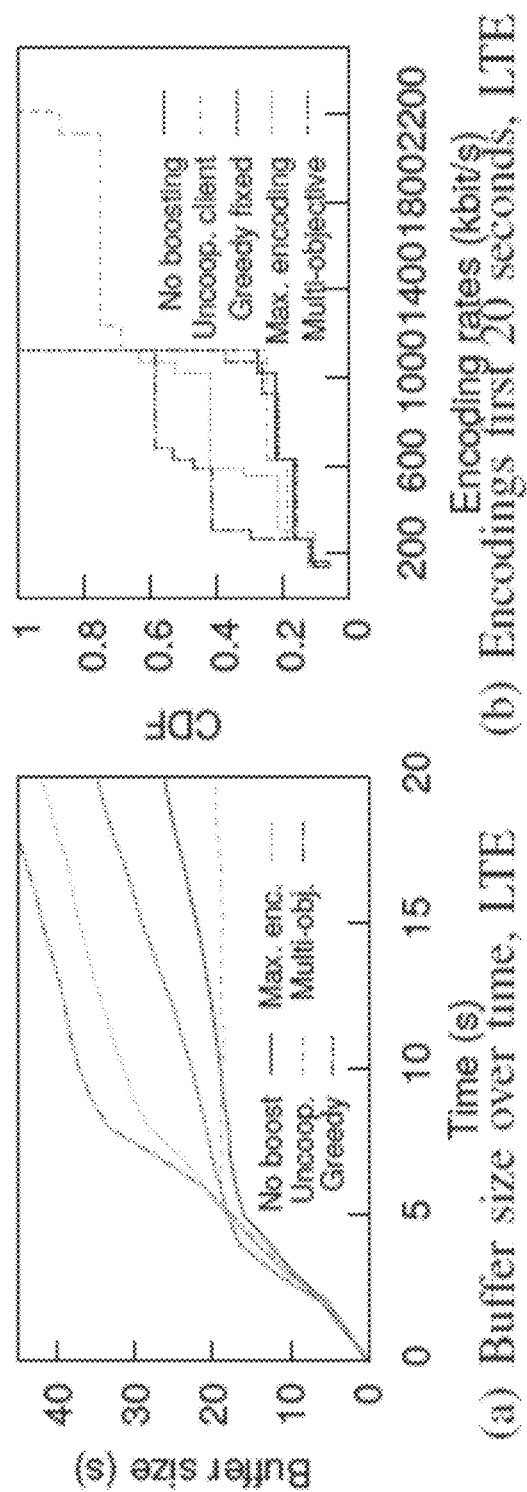
FIG. 2K depicts impact of boosting during initial 20 second startup phase (shown in panels a-b) according to various embodiments.

Looking beyond the initial chunk(s), temporary boosting combined with boost-aware adaptation can further help build up a fair sized buffer relatively quickly without sacrificing video quality. FIG. 2K (panels a and b) show the evolution of the average buffer size over time and the encoding CDF for an LTE client during the first 20 seconds. The corresponding results for WiFi (omitted) are similar.

Compared here are the three boost-aware client-side adaptation policies head-to-head, but also include results for two additional baseline policies. In the uncooperative client case, the client completely ignores all cap or boost information and instead downloads chunks as it normally would according to the HAS player's default adaptation algorithm, including the boost period. In the no boosting case, no boosting is provided by the network and the client simply goes back to using the HAS player's default adaptation algorithm. The healthiest buffer levels are observed when boosting is combined with the multi-objective quality policy. As expected, non-boosted and uncooperative clients perform the worst, showing that boosting is mostly wasted if clients do not cooperate. This strengthens the argument that cooperation between the clients and network is needed to achieve the best possible performance.

Figure 2L:
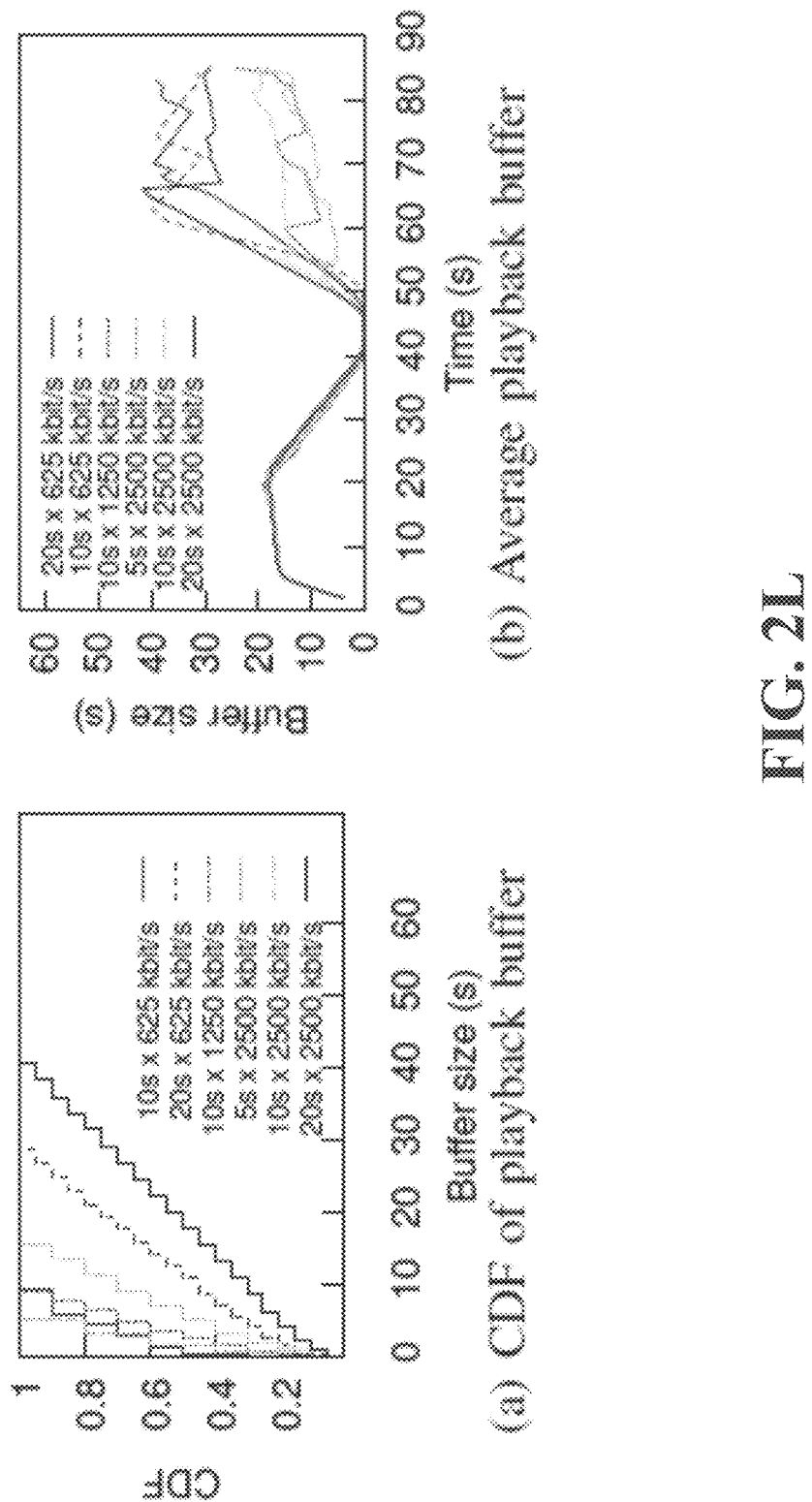
FIG. 2L depicts impact of boost duration and magnitude; LTE-based experiments (shown in panels a-b) according to various embodiments.

Still referring to the experimental evaluation of boosting, reference will now be made in particular to certain boost settings: duration and magnitude. The boost duration and magnitude impact the boost's effectiveness. FIG. 2L presents buffer size results for example boost durations and (extra) boost magnitudes in LTE experiments. WiFi results (omitted) are similar. Here, FIG. 2L (panel a) shows CDFs of the buffer occupancy during the boost periods and FIG. 2L (panel b) shows the average buffer values as a function of time. In all experiments, there are four competing clients with a shared bottleneck of 6000 kbit/s and individual caps of 1500 kbit/s. Furthermore, for one of the clients introduced is a 25 second near-outage (with 50 kbit/s) at the 20 second mark and then the client is boosted at the 45 second mark, when the buffer typically has fallen to (or roughly below) 10 seconds. Again presented are results only for multi-objective quality.

To allow comparisons of the impact of boost parameters, six example cases were carefully picked. Three of them have the same (extra) boost magnitude (measured as the difference between the boosted and non-boosted cap; i.e., $C^+-C$) of 2500 kbit/s, three have the same duration of 10 seconds, and three have the same time-aggregate boost (as calculated over the boost period; i.e., of $\delta(C^+-C)$) of 12500 kbit.

The boost magnitude is important for fast stall recovery. For example, the 2500 kbit/s boosts always provide faster buffer buildup during the first 5 seconds of the boosts than the 1250 kbit/s and 625 kbit/s boosts. In fact, with the 2500 kbit/s boost, it is possible to get back to the original buffer level within 10 seconds. With smaller boosts it takes longer. While the boost duration (e.g., when keeping the extra magnitude equal to 2500 kbit/s) does not impact the initial speed with which the buffer grows (FIG. 2l (panel b)), it has been found that longer duration boosts can be valuable if aiming for a large buffer at the end of the boost (e.g., right-most points in FIG. 2L (panel a)). Furthermore, comparing the three 2500 kbit/s curve after 20 seconds (at the 65 second mark), when only one of the 2500 kbit/s boosts are still active, what is seen is a clear ordering of the corresponding buffer sizes, with the 20 seconds boost providing by far the largest buffer of these three. The observations are consistent across both WiFi (omitted) and LTE.

Finally, note that further speedups have been achieved in the buffer recovery (for a given boost) with the help of a scheduler that temporarily gives more weight to the boosted client's video flow. However, commodity base stations typically currently cannot distinguish application layer characteristics in traffic. These results are therefore omitted. In any case, various embodiments of the framework could be a good platform for such optimization (e.g., if similar functionality is made available in 5G and future WiFi base stations).

Reference will now be made to simulation-based evaluation of boosting according to an embodiment. To evaluate the long-term dynamics of cap-based boosting used were simulations with four active clients. Each client plays videos back-to-back for a total of 150 viewings per client. When a client completes the playback of one video, it randomly picks another from a set of 50 videos. For each video, the simulations keep track of the exact chunk sizes (extracted from 50 YouTube videos), playback position, and playback duration. All clients are capped at 1500 kbit/s with a shared bottleneck of 6000 kbit/s. For one in every four viewings, the simulations then introduce a 20 second (complete) outage at a random time during the session (forcing low buffer conditions). At times when the buffer falls below 10 seconds, the network boosts the client to 2500 kbit/s for 25 seconds, and the client uses the boost-aware adaptation algorithms, when applicable.

Figure 2M:
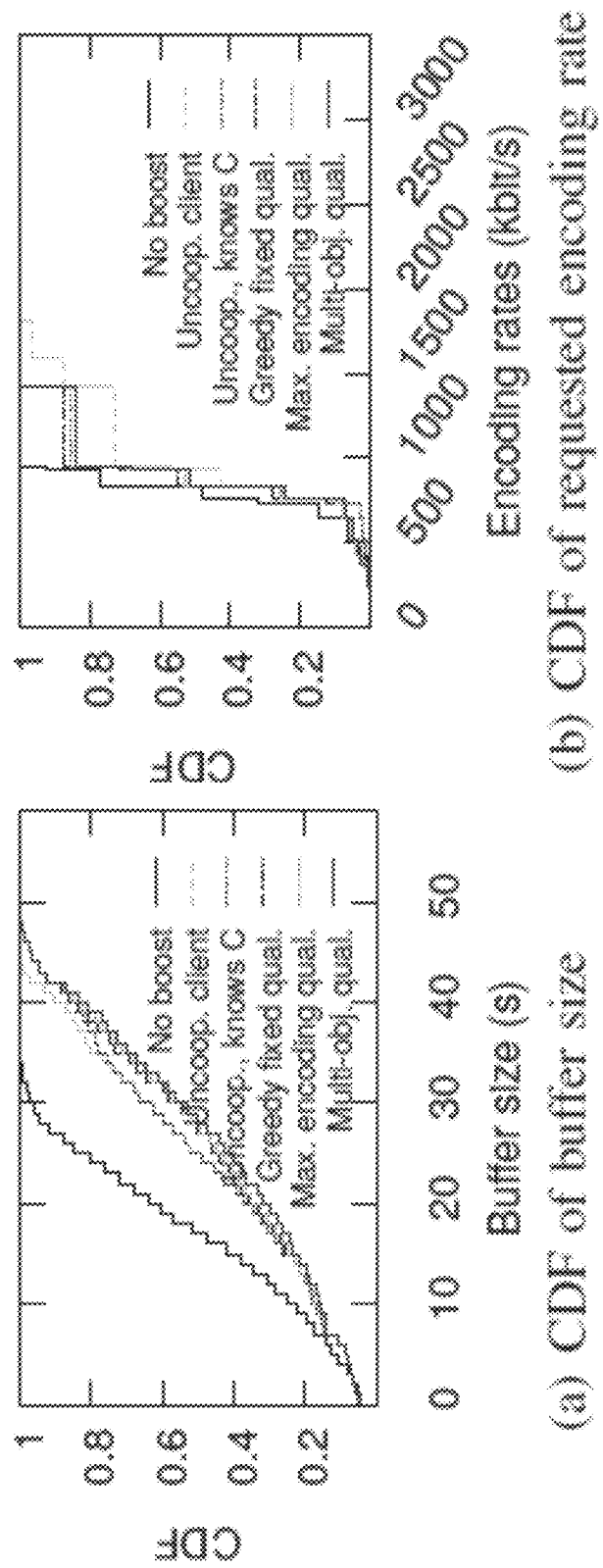
FIG. 2M depicts comparison of different policies (shown in panels a-b) according to various embodiments.
Figure 2N:
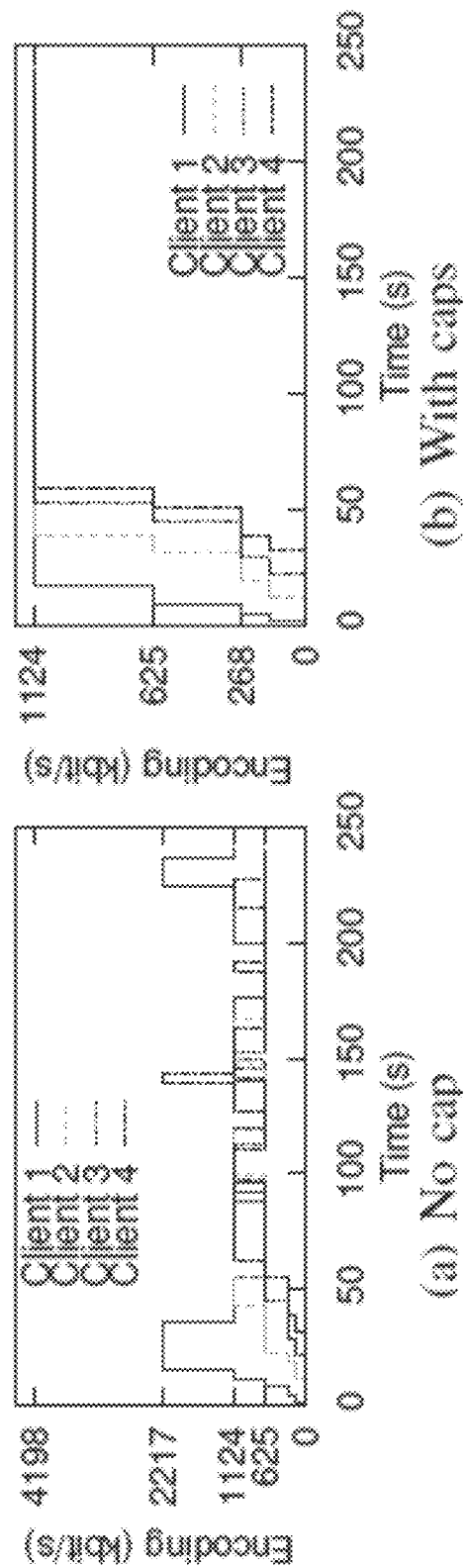
FIG. 2N depicts encoding rates in simulated scenario (shown in panels a-b) according to various embodiments.
Figure 20:
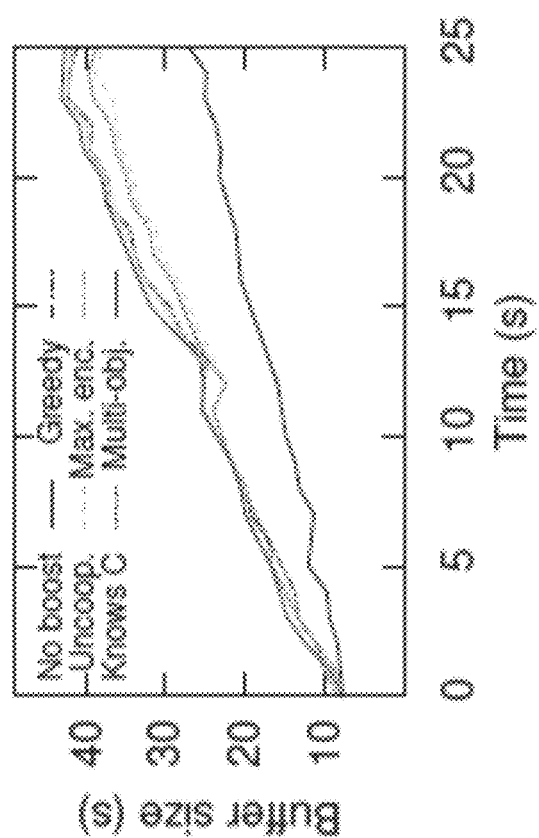

FIG. 2M shows (in panels a and b) the CDFs of the buffer size and the requested encodings observed during the boost period, respectively, for each of the above policies. In addition to the uncooperative client and no boosting baselines, also included are baseline results with an uncooperative client that knows C and therefore restrains itself from downloading chunks at encoding higher than $\max_j (Q_j|Q_j \leq C)$, but otherwise applies the HAS player's default adaptation algorithm. When interpreting these results it is important to note that the simulations do not capture all the subtle interactions between TCP and (competing) HAS players, and that certain fixed-cap validation results (mostly omitted) have shown that the simulator provides conservative estimates of the improvements of fixed rate caps. To support the claim that the differences observed with simulations are conservative, included are simulation results for the requested encoding rates (FIG. 2N) for the same scenario as the original OSMF experiments (FIG. 2B). Similar reasons explain the smaller differences between the boost-aware policies observed here vs. testbed. Yet, the simulations validate the relative performance tradeoffs between the policies. For example, while the differences are smaller between the policies than in the more realistic testbed experiments, the relative performance tradeoffs are the same and the largest buffer improvements (e.g., relative to non-boosted clients) are observed with the boost-aware policies.

Figure 2P:
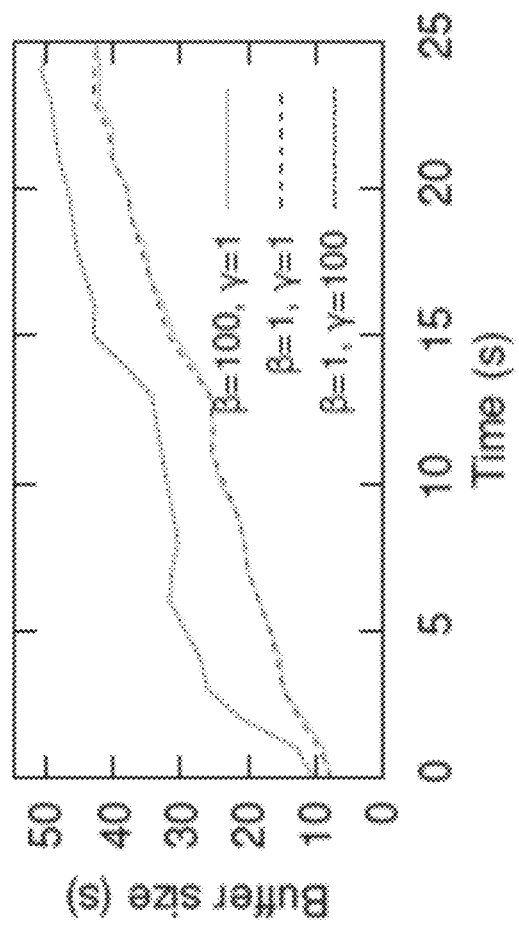
FIG. 2P depicts buffer size; multi-objective quality with different $\beta,\gamma$ ($\alpha=0.5$) according to various embodiments.

The boost-aware policies all perform relatively similar, with only smaller variations in their relative tradeoffs. Throughout the 150 viewings per policy, only observed was a single stall per policy. Similar observations can be made from the average buffer conditions as a function of the time since the boost period begun, shown in FIG. 2O. This figure also shows how multi-objective quality, as per design, most quickly builds up the buffer during the initial part of the boost period. Quickly filling a buffer as a safety margin is important, as it can reduce stall duration and speed up recovery. Finally, note that selecting a large γ (compared to β) with multi-objective quality, further stresses the importance to quickly ramp up the buffer size (FIG. 2P), at the expense of a few extra low-encoding chunks at the start.

As described herein, unstable quality and unfair sharing of bottleneck bandwidth are known to affect HAS clients, commonly occurring when HAS flows compete with each other or with background traffic ([7] S. Akhshabi, L. Anantakrishnan, C. Dovrolis, and A. C. Begen, "Serverbased traffic shaping for stabilizing oscillating adaptive streaming players," in Proc. ACM NOSSDAV, 2013; [12] R. Houdaille and S. Gouache, "Shaping http adaptive streams for a better user experience," in Proc. ACM MMSys, 2012). Prior conventional technologies include client-, network-, and server-based approaches to address these problems. The client-based techniques attempt to address the issue using robust quality adaptation algorithms ([3] T. Huang, N. Handigol, B. Heller, N. McKeown, and R. Johari, "Confused, timid, and unstable: Picking a video streaming rate is hard," in Proc. ACM IMC, 2012; [23] Y. Sun, X. Yin, J. Jiang, V. Sekar, F. Lin, N. Wang, T. Liu, and B. Sinopoli, "CS2P: Improving video bitrate selection and adaptation with data-driven throughput prediction," in Proc ACM SIGCOMM, 2016, [11] K. Spiteri, R. Urgaonkar, and R. K. Sitaraman, "BOLA: near-optimal bitrate adaptation for online videos," in Proc. IEEE INFOCOM, 2016) and better bandwidth estimation ([24] L. Zhi, Z. Xiaoqing, J. Gahm, P. Rong, H. Hao, A. Begen, and D. Oran, "Probe and adapt: Rate adaptation for HTTP video streaming at scale," IEEE Journal on Selected Areas in Communications, 2014). Neither of these fully solve the instability at scale. Network-based and server-based solutions include server-based shaping ([7] S. Akhshabi, L. Anantakrishnan, C. Dovrolis, and A. C. Begen, "Serverbased traffic shaping for stabilizing oscillating adaptive streaming players," in Proc. ACM NOSSDAV, 2013), cooperative proxy-caches ([25] V. Krishnamoorthi, N. Carlsson, D. Eager, A. Mahanti, and N. Shahmehri, "Helping hand or hidden hurdle: Proxy-assisted HTTP-based adaptive streaming performance," in Proc. IEEE MASCOTS, 2013; [26] S. Benno, J. O. Esteban, and I. Rimac, "Adaptive streaming: The network HAS to help," Bell Lab. Tech. Journal, 2011), network-assisted prioritization ([27] S. Petrangeli, T. Wauters, R. Huysegems, T. Bostoen, and F. D. Turck, "Software-defined network-based prioritization to avoid video freezes in HTTP adaptive streaming," Int. Journ. of Netw. Management, 2016), and network-assisted quality selection ([28] N. Bouten, R. de Schmidt, J. Famaey, S. Latre, A. Pras, and F. D. Turck, "QoE-driven in-network optimization for adaptive video streaming based on packet sampling measurements," Computer Networks, 2015). Server-based approaches are complex to implement in today's CDN-based HAS delivery, where edge nodes would need to maintain shaping profiles for many clients, since they typically serve the same content across different networks (Tier 1-3 ISPs) and last mile technologies (WiFi, LTE, Ethernet).

Certain other techniques focus on network-side solutions. The centralized control architecture of SDN is proposed to facilitate dynamic shaping of flows ([29] J. Kleinrouweler, S. Cabrero, and P. Cesar, "Delivering stable highquality video: An SDN architecture with DASH assisting network elements," in Proc. ACM MMSyS, 2016; [30] A. Bentaleb, A. C. Begen, and R. Zimmermann, "SDNDASH: Improving QoE of HTTP adaptive streaming using software defined networking," in Proc. ACM MMSyS, 2016; [31] D. Bhat, A. Rizk, M. Zink, and R. Steinmetz, "Network assisted content distribution for adaptive bitrate video streaming," in Proc. MMSys, 2017; [32] G. Cofano, L. D. Cicco, T. Zinner, A. Nguyen-Ngoc, P. Tran-Gia, and S. Mascolo, "Design and experimental evaluation of network-assisted strategies for HTTP adaptive streaming," in Proc. ACM MMSyS, 2016). However, these solutions require converting current carrier networks to an SDN architecture and adding new HAS specific network elements, which is not realizable in the short term. While solutions implemented in gateway modems and routers can solve issues related to stability and fairness, such solutions do not address competition with other clients in upstream links ([12] R. Houdaille and S. Gouache, "Shaping http adaptive streams for a better user experience," in Proc. ACM MMSys, 2012. Several network-based approaches optimize the rate adaptation across multiple parallel clients ([33] N. Bouten, S. Latr'e, J. Famaey, W. Van Leekwijck, and F. De Turck, "In-network quality optimization for adaptive video streaming services," IEEE Trans. on Multimedia, vol. 16, no. 8, pp. 2281-2293, 2014; [14] D. D. Vleeschauwer, H. Viswanathan, A. Beck, S. Benno, G. Li, and R. Miller, "Optimization of http adaptive streaming over mobile cellular networks," in Proc. IEEE INFOCOM, 2013) or the bandwidth share given to each client ([34] A. H. Zahran, J. J. Quinlan, K. K. Ramakrishnan, and C. J. Sreenan, "SAP: Stall-aware pacing for improved DASH video experience in cellular networks," in Proc. ACM MMSys, 2017). However, they lack experimental evaluation with real clients and live network deployments. While some of them suggest bandwidth shaping at cellular base stations ([14] D. D. Vleeschauwer, H. Viswanathan, A. Beck, S. Benno, G. Li, and R. Miller, "Optimization of http adaptive streaming over mobile cellular networks," in Proc. IEEE INFOCOM, 2013; [34] A. H. Zahran, J. J. Quinlan, K. K. Ramakrishnan, and C. J. Sreenan, "SAP: Stall-aware pacing for improved DASH video experience in cellular networks," in Proc. ACM MMSys, 2017), the actual impact on real traffic is unknown. The practicality of such approach is also very low, since current standards do not include visibility into transport or higher layers by cellular base stations, nor do current implementations have such capabilities.

In contrast to these works, various embodiments described herein first measure the impact of simple rate caps on HAS traffic in a real cellular network and report their implications at scale, finding both benefits and drawbacks. It is believed that various embodiments described herein represent the first study of the performance of rate boosting in a cooperative cap-based system. Various embodiments provide improvements suitable for current traffic management practices, reducing the step to actual deployment (but are also applicable to future design with potential additions of new network elements).

As described herein are embodiments for client-network cooperative boosting as a framework for improving conventional HAS video streaming under rate caps (as such conventional HAS video streaming is currently deployed in today's networks). As described herein is a comprehensive study of the rate cap impact on HAS videos, which spans testbed experiments using multiple players, trace-driven simulations, and passive measurements from a real-world test deployment. As described herein, an identification has been made that the impact of fixed caps in a cellular network is largely positive, with improved playback and buffer stability, as well as data savings, but the drawbacks include slower startup and stall recovery, as well as slow buffer fill. To address the key shortcomings, various embodiments described herein provide a cooperative rate-boosting approach, where the network boosts the cap when clients need it. Using experiments and simulations, demonstrated herein is the increasing benefit of boosting with increased information exchange between the client and network. Various embodiments described herein provide a client-side rate adaptation algorithm to optimize the benefit of boosting, which recovers all startup impairments and improves user experience, while eliminating wasted bandwidth and hence reducing cost for both users and the network.

Figure 2Q:
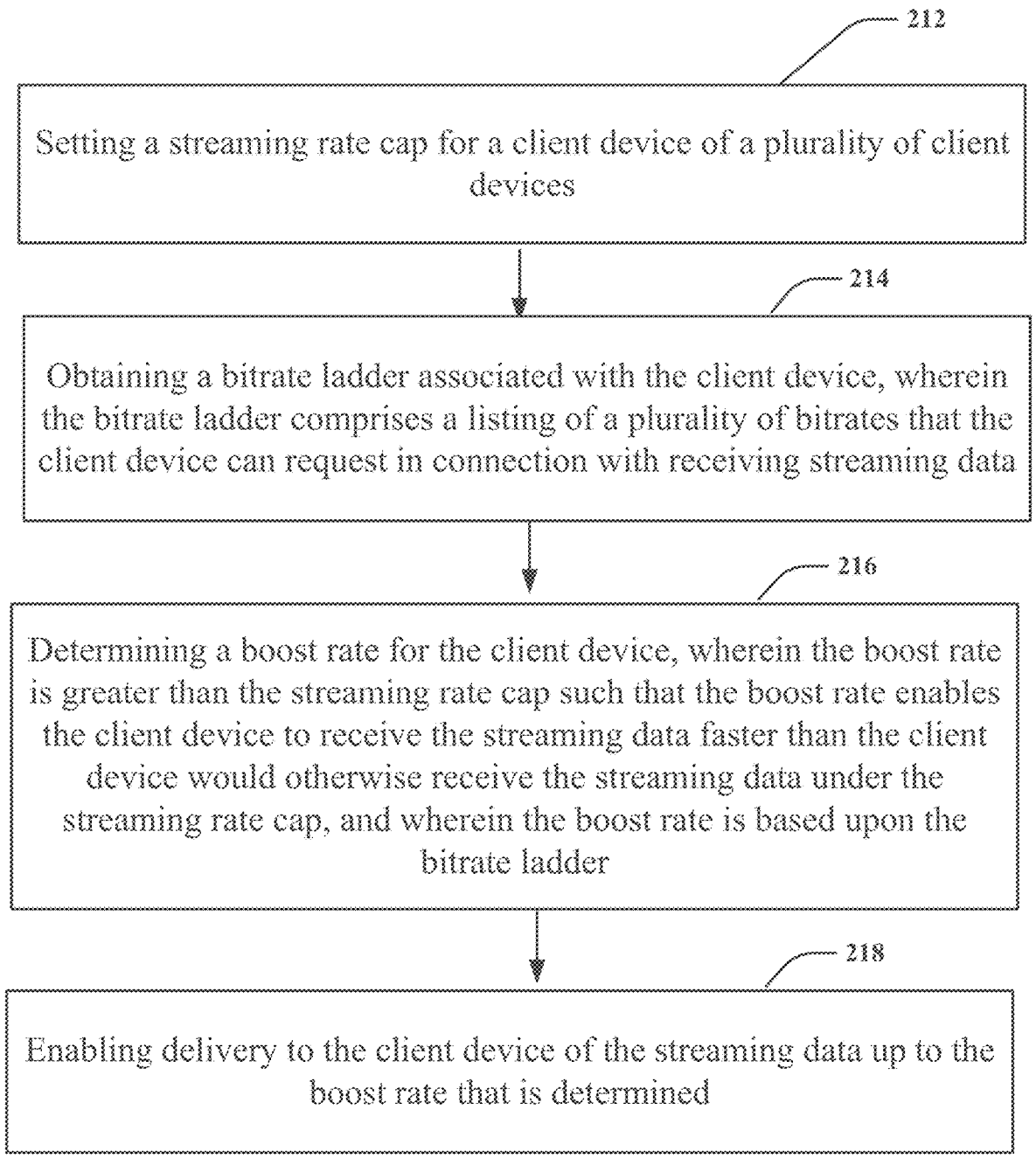
FIG. 2Q depicts an illustrative embodiment of a method in accordance with various aspects described herein.

Referring now to FIG. 2Q, this depicts an illustrative embodiment of a method 210 in accordance with various aspects described herein. As seen in this FIG. 2Q, step 212 comprises setting a streaming rate cap for a client device of a plurality of client devices. Next, step 214 comprises obtaining a bitrate ladder associated with the client device, wherein the bitrate ladder comprises a listing of a plurality of bitrates that the client device can request in connection with receiving streaming data. Next, step 216 comprises determining a boost rate for the client device, wherein the boost rate is greater than the streaming rate cap such that the boost rate enables the client device to receive the streaming data faster than the client device would otherwise receive the streaming data under the streaming rate cap, and wherein the boost rate is based upon the bitrate ladder. Next, step 218 comprises enabling delivery to the client device of the streaming data up to the boost rate that is determined. In one example, a network device is part of a network that provides the streaming data to the client device.

While for purposes of simplicity of explanation, the respective processes are shown and described as a series of blocks in FIG. 2Q, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. In other examples, one or more blocks may be used multiple times (e.g., a client may need to be boosted multiple times).

Figure 2R:
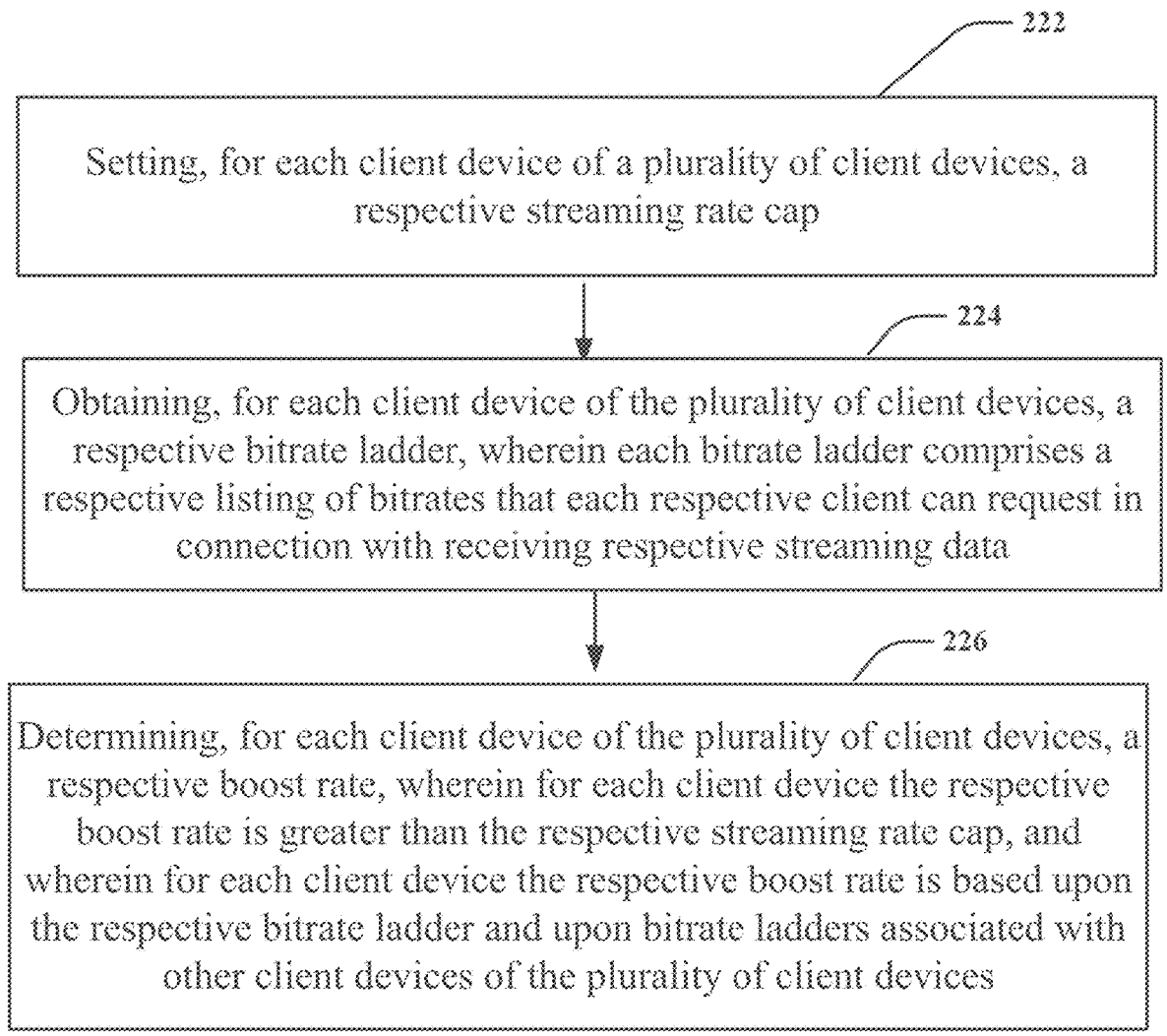
FIG. 2R depicts an illustrative embodiment of a method in accordance with various aspects described herein.

Referring now to FIG. 2R, this depicts an illustrative embodiment of a method 220 in accordance with various aspects described herein. As seen in this FIG. 2R, step 222 comprises setting, for each client device of a plurality of client devices, a respective streaming rate cap. Next, step 224 comprises obtaining, for each client device of the plurality of client devices, a respective bitrate ladder, wherein each bitrate ladder comprises a respective listing of bitrates that each respective client can request in connection with receiving respective streaming data. Next, step 226 comprises determining, for each client device of the plurality of client devices, a respective boost rate, wherein for each client device the respective boost rate is greater than the respective streaming rate cap, and wherein for each client device the respective boost rate is based upon the respective bitrate ladder and upon bitrate ladders associated with other client devices of the plurality of client devices.

While for purposes of simplicity of explanation, the respective processes are shown and described as a series of blocks in FIG. 2R, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. In other examples, one or more blocks may be used multiple times (e.g., a client may need to be boosted multiple times).

Figure 2S:
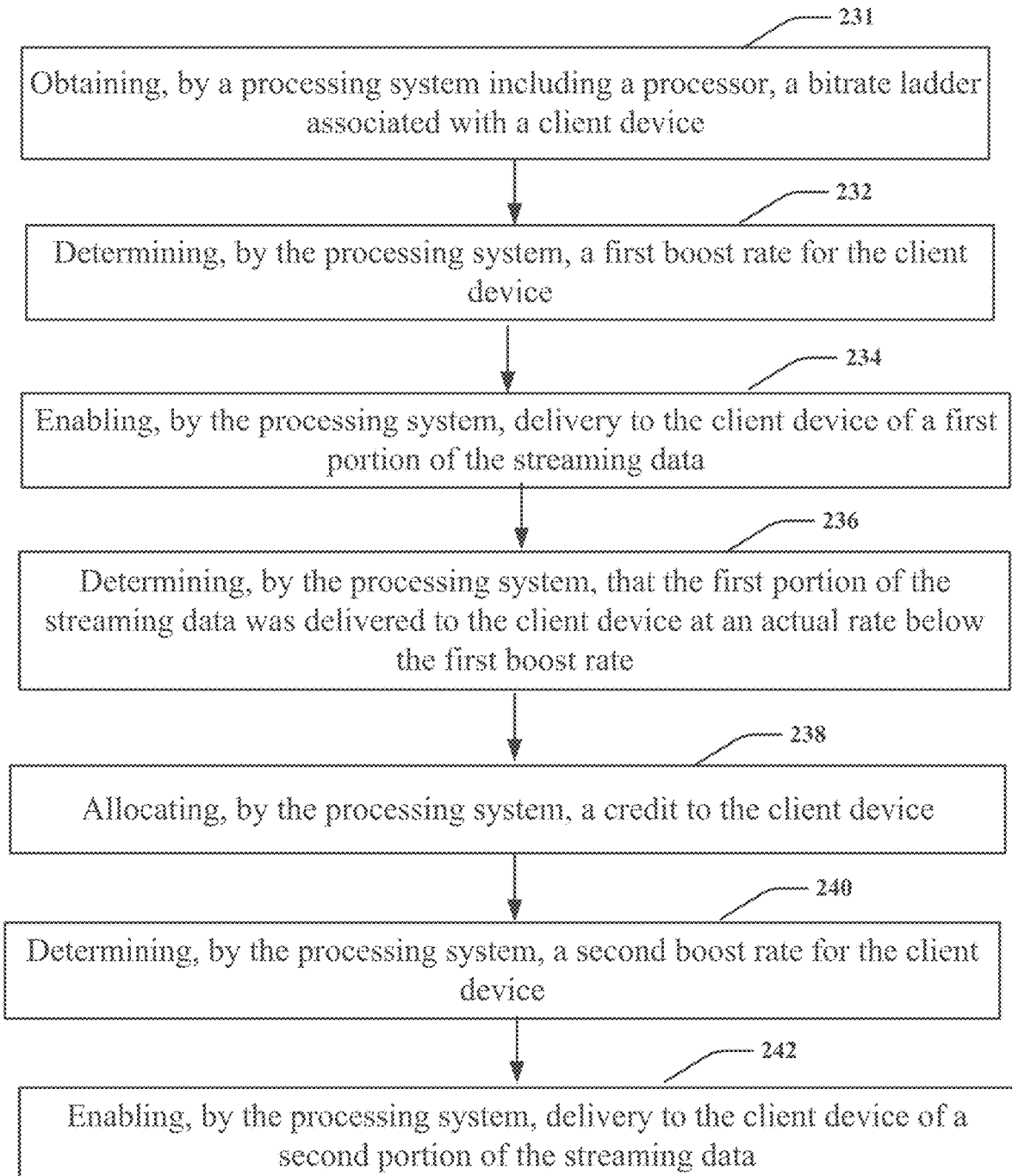
FIG. 2S depicts an illustrative embodiment of a method in accordance with various aspects described herein.

Referring now to FIG. 2S, this depicts an illustrative embodiment of a method 230 in accordance with various aspects described herein. As seen in this FIG. 2S, step 231 comprises obtaining, by a processing system including a processor, a bitrate ladder associated with a client device, wherein the bitrate ladder comprises a listing of a plurality of bitrates that the client device can request in connection with receiving streaming data. Next, step 232 comprises determining, by the processing system, a first boost rate for the client device, wherein the first boost rate is greater than a streaming rate cap for the client device such that the first boost rate enables the client device to receive the streaming data faster than the client device would otherwise receive the streaming data under the streaming rate cap, and wherein the first boost rate is based upon the bitrate ladder. Next, step 234 comprises enabling, by the processing system, delivery to the client device of a first portion of the streaming data.

Next, step 236 comprises determining, by the processing system, that the first portion of the streaming data was delivered to the client device at an actual rate below the first boost rate. Next, step 238 comprises allocating, by the processing system, a credit to the client device, wherein the credit reflects a difference between the first boost rate that was determined and the actual rate at which the first portion of the streaming data was delivered to the client device. Next, step 240 comprises determining, by the processing system, a second boost rate for the client device, wherein the second boost rate is greater than the streaming rate cap for the client device such that the second boost rate enables the client device to receive the streaming data faster than the client device would otherwise receive the streaming data under the streaming rate cap, and wherein the second boost rate is based upon the credit allocated to the client device. Next, step 242 comprises enabling, by the processing system, delivery to the client device of a second portion of the streaming data, wherein the second portion of the streaming data is delivered up to the second boost rate.

While for purposes of simplicity of explanation, the respective processes are shown and described as a series of blocks in FIG. 2S, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. In other examples, one or more blocks may be used multiple times (e.g., a client may need to be boosted multiple times).

FIG. 2T is a block diagram illustrating an example, non-limiting embodiment of a system functioning within the communication network of FIG. 1 in accordance with various aspects described herein. As seen in this FIG. 2T, rate setting intelligence 244 is in operative communication with edge node 242. In one example, rate setting intelligence 244 can comprise computer hardware (such as one or more servers), software and/or firmware. In another example, edge node 242 can comprise computer hardware (such as one or more servers), software and/or firmware. In another example, edge node 242 can act as (and/or form part of) a CDN (content distribution network). Still referring to FIG. 2T, rate setting intelligence 244 is in operative communication with each of Client Device A 246A, Client Device B 246B, and Client Device C 246C. In various embodiments, rate setting intelligence 244 can facilitate the rate setting and data streaming described herein.

As described herein, various embodiments provide a cap-based client-network interaction for improved streaming experience.

As described herein, to alleviate certain issues related to conventional techniques, various embodiments provide a network that cooperates with the streaming clients to improve the overall QoE, while reducing wasted bandwidth. As described herein, explored are the performance tradeoffs of data rate caps that limit the maximum bandwidth of each video stream to tune the maximum quality (and video bitrate) requested by clients. Rate cap is probably the most simple, effective and scalable mechanism commonly applied in networks to control bandwidth demand ([8] A. M. Kakhki, F. Li, D. Choffnes, A. Mislove, and E. K. Bassett, "BingeOn Under the Microscope: Understanding T-Mobile's Zero-Rating Implementation," in Proc. Internet-QoE Workshop, 2016; [9] T. Flach, P. Papageorge, A. Terzis, L. Pedrosa, Y. Cheng, T. Karim, E. Katz-Bassett, and R. Govindan, "An Internet-Wide Analysis of Traffic Policing," in Proc. ACM SIGCOMM, 2016). To fully understand the impact of rate caps on HAS video, a comprehensive study (described herein) used controlled testbed experiments and simulations, with and without caps. The findings highlight the main benefits and drawbacks of fixed rate cap when serving HAS clients. On the positive side, fixed rate caps are shown to significantly improve fairness and stability (e.g., reduced number of quality switches, in some cases reduce the number of stalls and their durations, and reduce the bandwidth wasted on video bitrates that either exceed the sustainable playback rate or provide no additional utility on small-size screens). The main drawbacks observed are increased startup times and slower stall recovery.

Motivated by the above observations, various embodiments provide a cap-based framework with boosting that leverages the advantages of caps while simultaneously alleviating the drawbacks. First, the network temporarily boosts clients during their startup phase, after a stall, and when they are under low-buffer conditions. Second, these network-side boost periods are complemented with boost-aware client-side adaptation based on optimization of QoE-related metrics. It is shown that temporary bandwidth boosting combined with boost-aware client-side adaptation helps reduce the startup times, speed up buffer recovery after the stall, and improve buffer occupancy.

Next, according to various embodiments, the focus is on the impact and value of the information sharing between clients and the network. Through evaluation of several policies that differ in the degree of information sharing, it is shown that there are significant performance benefits from timely information sharing and cooperation. Ideally, the network should have good knowledge of clients under low-buffer conditions, while clients should have (explicit or implicit) knowledge about the caps and the boost periods, so they could optimize the use of the extra bandwidth. Various results described herein particularly highlight the importance of clients acquiring and using information regarding caps when being boosted; e.g., as with various boost-aware adaptation algorithms described herein.

Certain significant contributions described herein are: (i) a comprehensive study highlighting the benefits and drawbacks of using a fixed cap; (ii) a cap-based boost framework that consists of network side boosting and boost-aware client-side rate adaptation algorithms; and (iii) experimental insights from implementing and testing these mechanisms under a wide range of scenarios.

As described herein, various embodiments focus on determining the optimal boosting rate for one or more uncooperative (or unaware) clients, where the network decides by itself. In one example, due to different bitrate ladders per client, the network determines how to set the boost (magnitude and duration) so that it helps the client(s) start faster and recover from stall sooner, but at the same time prevent the client(s) from requesting too high video quality. In one example, the network knows each bitrate of each bitrate ladder. In one example, this is a decision that improves throughput while not exceeding desired quality level (a key in this example is in using the bitrate ladder intelligently—this can be on top of estimates like BUFFEST ([17] V. Krishnamoorthi, N. Carlsson, E. Halepovic, and E. Petajan, "Buffest: Predicting buffer conditions and real-time requirements of http(s) adaptive streaming clients," in Proc. ACM MMSys, 2017) for buffer, and MIMIC/eMIMIC ([18] T. Mangla, E. Halepovic, M. Ammar, and E. Zegura, "MIMIC: Using passive network measurements to estimate HTTP-based adaptive video QoE metrics," in Proc. IEEE/IFIP TMA, 2017) for bitrates). In another example, the network can force the client to use a particular coding and/or bitrate. In another example, the network can provide for decoupling between rate and encoding. In another example, the network can make decisions based upon how full each client buffer is.

As described herein, various embodiments provide for using a global view and taking into account bitrates and available capacity determination after fixed cap is assigned ("free bandwidth"). In one example, a decision can be made as to how to use the free bandwidth for boosting needy clients. In one example, bandwidth fairness can be used to set initial rate cap for one or more clients.

As described herein, various embodiments provide a credit based system. For example, if a client C gets allocated 1.5 Mbps and uses only 1 Mbps, then client C gets credit for the difference (wherein, for example, the credit can be used at a later time). Subsequent boosting (duration and magnitude) can be given based on accumulated credits, in addition to some default boosting "amount" that all clients can get.

As described herein, various embodiments provide a mechanism wherein the network determines that there exist several flows (e.g., video, audio, subtitles, metadata). In one example, under contention, only one flow can be boosted. In another example, other flow(s) can be deprioritized or boosted as well. In one specific example, the mechanism can allow video to stall, but audio to continue. In another example, the mechanism can be applied to multiple video streams (such as multi-camera views, tiled video in 360, alternative scenes in gaming, etc.). At a high level, it is boosting one flow of several flows to the same client. In another example, related to tiling, surrounding tiles can get lower quality (e.g., only boost field of view and/or reduce/eliminate out of field of view). In another example, the flow type can be inferred (e.g., by the network). In another example, the mechanism can shape/boost per device and/or per flow.

As described herein, various fixed rate cap issues can be addressed by boosting. In various embodiments, boosting can be implemented using consideration of competing clients, consideration of a bandwidth cap, consideration of a global view of the network, and/or consideration of quality adaptation. In one specific example, the global view can be used to apportion an original (unboosted) fixed rate cap. In another specific example, an original (unboosted) rate cap can be an arbitrary value (that does not take into account, for example, traffic congestion at one or more cells (of a cellular communication system). In another specific example, an original (unboosted) rate cap can be a total cap for one or more base stations. In another specific example, an original (unboosted) rate cap can be a total cap for one or more cells (of a cellular communication system). In another specific example, a rate cap determination can be based upon information regarding whether or not data can get through a "pipe" (data communication path) to a base station (if data can get through the "pipe" to the base station, then (in one example) the rate cap determination can be based upon a capacity of a cell).

In another specific example, boosting of one client is not provided in a manner that adversely affects one or more other clients. In another specific example, boosting of one client is not provided in a manner that significantly adversely affects one or more other clients.

As described herein, various embodiments provide boosting via the network itself (e.g., by one or more elements of the network that delivers content).

As described herein, various embodiments provide for the interaction between video clients and the network for improved user experience. Traditionally, clients (e.g., end user devices and applications) do not directly interact with the network, only with the other end host, while the network just transmits the data. Starting a number of years ago, proposals have begun appearing regarding client-network interactions, quite a lot of them directed towards 5G architectures. Since video streaming is already the dominant traffic, managing its further growth effectively will likely be a top priority for network operators over the next 5-10 years, and client-network (or CP/ISP) interaction is expected to be the center piece. Various embodiments improve the current conventional cap-based approach by adding intelligence and interactions between video clients and the network.

As described herein, video content providers are overwhelming the networks, especially cellular, with video content. While doing so, they are often delivering excessive volume of data driven by the high visual quality of videos. This both expends users' data limit on metered links (like cellular) and generates capacity saturation for the operator. A conventional approach is for operators to detect video flows and cap them to a certain fixed data rate. A problem with fixed caps is that videos start slower, recover from stalls slower, and suffer from lower quality during periodic congestion when available bandwidth is even lower than the fixed cap applied. Various conventional solutions don't have a way of knowing what the congestion is at the downstream bottleneck when applying caps typically far away in the network. Various embodiments solve (fully or partially) the problem of this negative impact of the fixed cap approach.

Various embodiments solve (fully or partially) this problem by having different levels of interaction between clients and the network. In one example, the network will apply boosted (higher) cap temporarily during critical times for the client. For example, these times are initial startup, just after stall, or during a period when congestion has forced the video client to deplete its pre-fetch buffer. The full cooperation between client and the network yields the best results. Here, each client can explicitly notify the network about their state (buffer, etc.) and the network will inform each client how much boost it will receive and for how long it will receive such boost. The client can now use the intelligent adaptation algorithm to extract the benefit, which (as described herein) can recover some or all of the startup slowdowns caused by the original rate cap. Other examples relate to partial cooperation and no cooperation variations, which yield some, but smaller benefits. Partial assumes only one side shares its information, and non-cooperative assumes no information exchange, but the network can still apply boost using inference of the client state (for example, using BUFFEST mentioned herein).

In various embodiments the benefits include recovery of lost performance due to fixed cap (as conventionally implemented in practice). A key advantage of various embodiments described herein is an improvement in performance and user experience. In other examples, it is shown herein that in some cases, performance (e.g. startup) can be improved over the original "before the cap" levels. Various embodiments provide the ability to achieve both demand and capacity management by still using rate caps, but in a highly effective manner (and, for example, without drawbacks such rate caps typically bring).

As described herein, under various embodiments, network provides high bandwidth when the client needs it (the network can be provided, for example, with state information of the client (such state information can comprise, for example, start of a new video, recovery from a stall)).

Conventionally, the first chunk of a video is usually sent very fast, then the link slows down. A similar situation usually occurs with a conventional mechanism after a video stall. Various embodiments described herein improve performance in such situations.

As described herein, various embodiments provide a mechanism to maintain a buffer (of a client) to protect from a stall (in contrast, conventional rate limiting usually prohibits the ability to maximize a large buffer with high bitrate).

As described herein, various embodiments can improve upon conventional "throughput guidance" wherein, for example, the network estimates network throughput and gives information to a client in a no cap scenario.

As described herein, various embodiments provide for the decoupling of the sender (e.g., a server that hosts the video being streamed) and the network (e.g., that determines the client's actual download rate of each chunk of the streaming video).

As described herein, various embodiments utilize knowledge of one or more bitrate ladders so as to make most use of the extra bandwidth (given the selection of bit rates that the client selects from).

As described herein, a boost rate can be applied to a subset of a plurality of data flows. In one example, a boost rate can be applied to a video data flow. In another example, a boost rate can be applied to an audio data flow. In another example, a boost rate can be applied to a subtitle data flow. In another example, a boost rate can be applied to a metadata data flow. In another example, a boost rate can be applied to a subset of a plurality of multi-video streams. In another example, a boost rate can be applied to a subset of a plurality of multi-camera views. In another example, a boost rate can be applied to a subset of a tiled 360 video. In another example, a boost rate can be applied to a subset of a branched video. In another example, a boost rate can be applied to a subset of alternative scenes in gaming.

As described herein, various embodiments provide for determining a boost rate before streaming starts (that is, making the determination of boost rate before the streaming starts) and/or determining a boost rate during streaming (that is, making a first and/or subsequent determination of boost rate during the streaming).

As described herein, various embodiments provide for determining a boost duration before streaming starts (that is, making the determination of boost duration before the streaming starts) and/or determining a boost duration during streaming (that is, making a first and/or subsequent determination of boost duration during the streaming).

As described herein, various embodiments provide for determining boost duration in an online manner (e.g., the network provider decides during a boost when to finish the boost).

As described herein, various embodiments provide for boosting at the beginning of streaming (e.g., streaming of video/audio content) and/or during streaming (e.g., streaming of video/audio content).

As described herein, various embodiments provide for the network to control the maximum rate at which data is delivered to the client(s).

As described herein, various embodiments can be augmented with additional information from the network (e.g., radio-level measurement(s)). For example, the network can use additional network measurements and/or client statistics (e.g., about coverage, loss rates, per-cell congestion information, and/or other radio channel characteristics and/or load conditions) to identify clients that either would not be able to take full advantage of the extra boost bandwidth and/or that may benefit from additional prioritization also at the lower network layers. This information could then be used to make further improved/informed boost decisions. For example, in some cases, it can be possible to use information about the current network conditions to identify an upper-bound on the highest boost rate that a given client could possibly benefit from unless the network conditions change. In other cases, the processing unit (and/or other mechanism(s)) could inform other network element(s) about the boost and with them coordinate so that the client(s) also receive additional help from these element(s), effectively increasing the rate that the client(s) can obtain during the boost. For example, a given client could temporarily be scheduled to receive additional LTE resource blocks during the boost. In some examples, additional coordination (e.g., cross layer) can be required across network layers and network elements.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200, the subsystems and functions of system 240, and methods 210, 220, 230 presented in FIGS. 1, 2A, 2Q, 2R, 2S, 2T. For example, virtualized communication network 300 can facilitate in whole or in part streaming data to one or more client devices.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
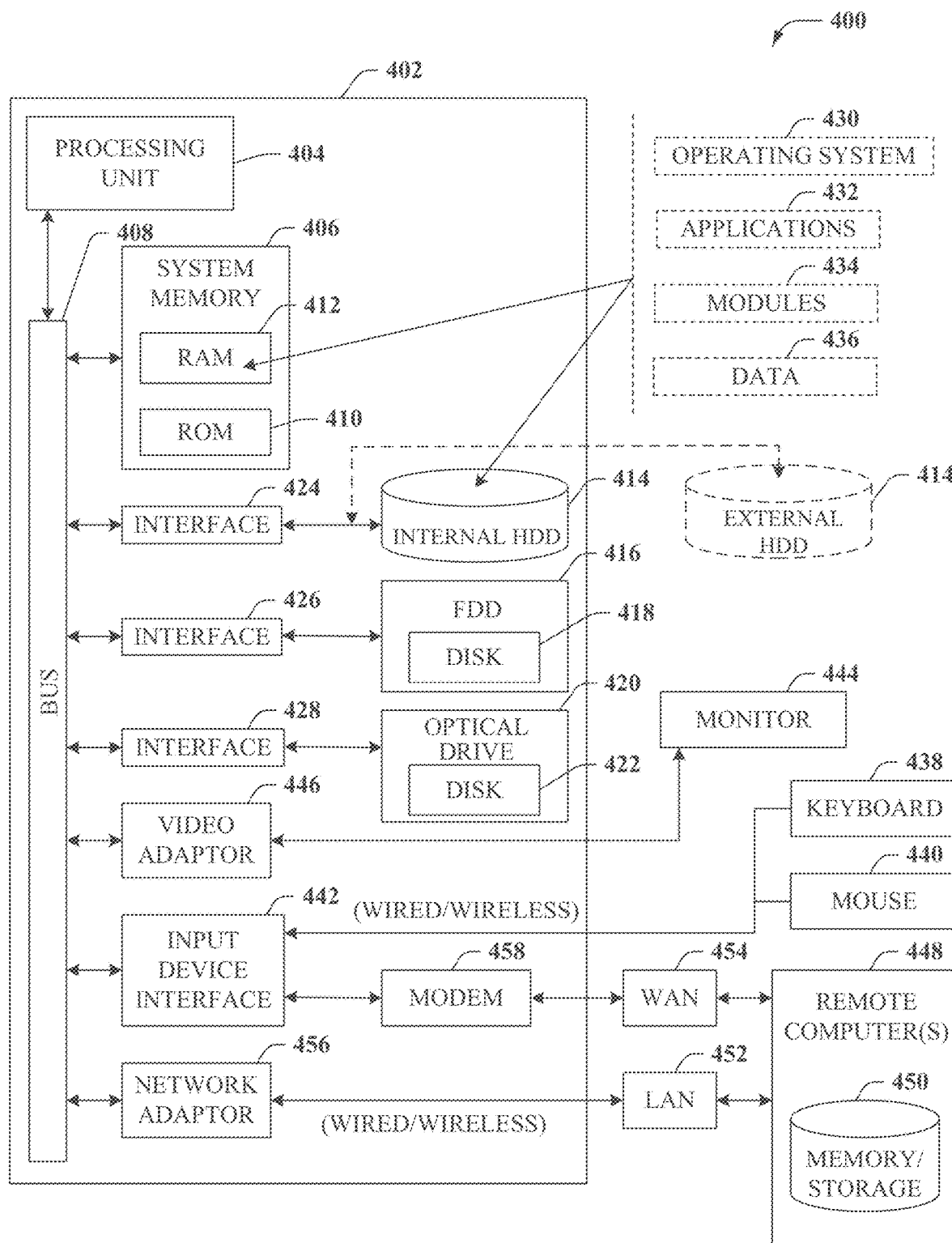
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part streaming data to one or more client devices.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
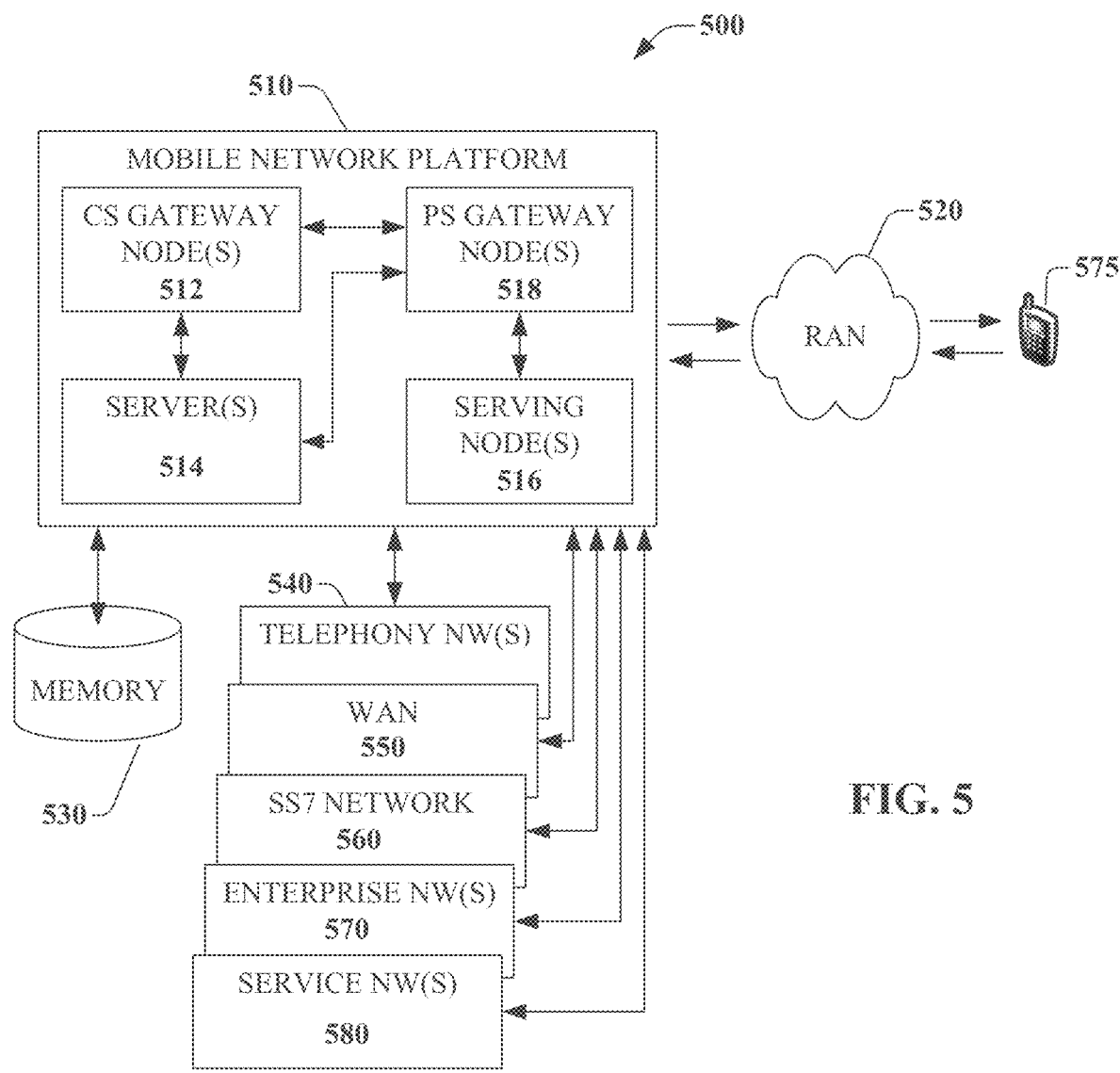
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part streaming data to one or more client devices. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
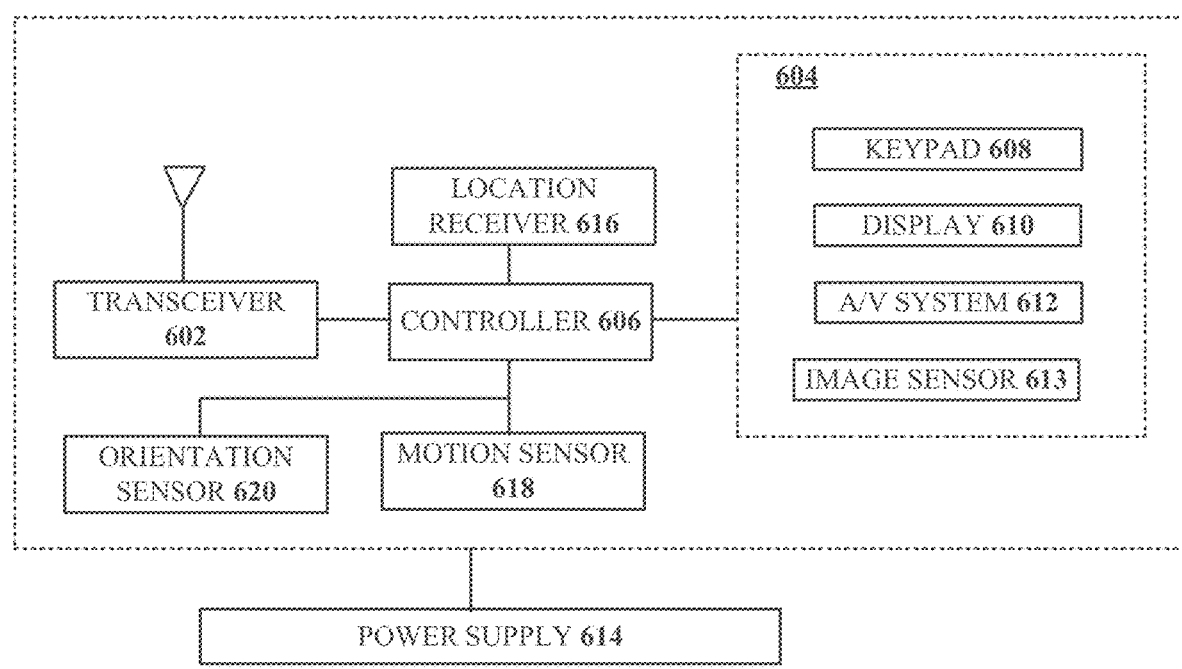
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part streaming data to one or more client devices.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically determining streaming data rates) can employ various AI-based schemes for carrying out various embodiments thereof. Moreover, a classifier can be employed to determine a ranking or priority related to streaming data to one or more client devices. A classifier is a function that maps an input attribute vector, $x=(x1, x2, x3, x4, \ldots, xn)$, to a confidence that the input belongs to a class, that is, $f(x)=$confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria streaming data rates/durations/starting times/ending times for various client devices, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method comprising:

obtaining, by a processing system of a network including a processor, a bitrate ladder associated with a client device, wherein the bitrate ladder comprises a listing of a plurality of bitrates that the client device can request in connection with receiving streaming data, wherein the streaming data comprises a plurality of data flows, and wherein the plurality of data flows comprises a video data flow having one or more first tiles in a field of view of a 360 degree video and one or more second tiles not in the field of view;

determining, by the processing system, a first boost rate for the client device, wherein the first boost rate is greater than a streaming rate cap for the client device such that the first boost rate enables the client device to receive the streaming data faster than the client device would otherwise receive the streaming data under the streaming rate cap, and wherein the first boost rate is based upon the bitrate ladder;

enabling, by the processing system, first delivery to the client device of a first portion of the streaming data;

determining, by the processing system, that the first portion of the streaming data was delivered to the client device at an actual rate below the first boost rate;

allocating, by the processing system, a credit to the client device, wherein the credit reflects a difference between the first boost rate that was determined and the actual rate at which the first portion of the streaming data was delivered to the client device;

determining, by the processing system, a second boost rate for the client device, wherein the second boost rate is greater than the streaming rate cap for the client device such that the second boost rate enables the client device to receive the streaming data faster than the client device would otherwise receive the streaming data under the streaming rate cap, and wherein the second boost rate is based upon the credit allocated to the client device;

obtaining, by the processing system, at least one radio channel characteristic that characterizes communication with the client device;

determining, by the processing system, a third boost rate for the client device, wherein the third boost rate is determined by applying an upper bound to the second boost rate, the upper bound being a highest boost rate that the client device can benefit from when the at least one radio channel characteristic is taken into account; and enabling, by the processing system, second delivery to the client device of a second portion of the streaming data, wherein the second portion of the streaming data is delivered up to the third boost rate, and wherein based upon inference by the network of data flow type the third boost rate is applied to the one or more first tiles without being applied to the one or more second tiles.

2. The method of claim 1, further comprising setting, by the processing system, the streaming rate cap for the client device.

3. The method of claim 1, wherein a content source provides the streaming data to the client device.

4. The method of claim 1, wherein the network comprises a base station and wherein the client device is a mobile device.

5. A network device comprising:
a processing system including a processor; and
a memory that stores executable instructions that, when executed by the processing system, perform operations, the operations comprising:
setting a streaming rate cap for a client device of a plurality of client devices;
obtaining from the client device a bitrate ladder associated with the client device, wherein the bitrate ladder comprises a listing of a plurality of bitrates that the client device can request in connection with receiving streaming data, wherein the streaming data comprises a plurality of data flows, and wherein the plurality of data flows comprises a video data flow having one or more first tiles in a field of view of a 360 degree video and one or more second tiles not in the field of view;
obtaining at least one radio channel characteristic that characterizes communication with the client device;
determining a first boost rate for the client device, wherein the first boost rate is greater than the streaming rate cap such that the first boost rate enables the client device to receive the streaming data faster than the client device would otherwise receive the streaming data under the streaming rate cap, and wherein the first boost rate is based upon the bitrate ladder;

determining a second boost rate for the client device, wherein the second boost rate is determined by applying an upper bound to the first boost rate, the upper bound being a highest boost rate that the client device can benefit from when the at least one radio channel characteristic is taken into account; and enabling delivery to the client device of the streaming data up to the second boost rate that is determined, wherein the network device is part of a network through which the streaming data is delivered to the client device, and wherein based upon inference by the network of data flow type the second boost rate is applied to the one or more first tiles without being applied to the one or more second tiles.

6. The network device of claim 5, wherein the first boost rate for the client device is further based upon other bitrate ladders that are respectively associated with each other client device of the plurality of client devices.

7. The network device of claim 5, wherein the plurality of data flows further comprises multiple video/audio data flows, a subtitle data flow, a metadata data flow, or any combination thereof.

8. The network device of claim 5, wherein the network device is configured to operatively communicate with a content source for providing the streaming data to the client device.

9. The network device of claim 5, wherein the setting the streaming rate cap for the client device comprises setting the streaming rate cap for each client device of the plurality of client devices.

10. The network device of claim 5, wherein the operations further comprise setting another streaming rate cap for another client device of the plurality of client devices.

11. The network device of claim 10, wherein the streaming rate cap differs from the another streaming rate cap, and wherein each of the streaming rate cap and the another streaming rate cap are set based upon a fairness metric.

12. The network device of claim 5, wherein the operations further comprise obtaining other bitrate ladders that are respectively associated with each other client device of the plurality of client devices, and wherein each of the other bitrate ladders is obtained from a respective one of the plurality of client devices.

13. The network device of claim 5, wherein the streaming data is delivered to the client device at the second boost rate for a period of time that is based upon a buffer fill level of the client device, and wherein, after the period of time has elapsed, the streaming data is provided to the client device at the streaming rate cap.

14. The network device of claim 5, wherein the network device comprises a server, wherein the determining the second boost rate further comprises determining a boost duration, and wherein the determining the boost duration is performed prior to delivery of the streaming data or during delivery of the streaming data.

15. The network device of claim 5, wherein the network comprises a base station and wherein each of the plurality of client devices is a mobile device.

16. A non-transitory computer-readable storage medium comprising executable instructions that, when executed by an element of a network including a processor, facilitate performance of operations, the operations comprising:

setting, for each client device of a plurality of client devices, a respective streaming rate cap;

obtaining a respective bitrate ladder associated with each client device, wherein each bitrate ladder comprises a respective listing of bitrates that each respective client device can request in connection with receiving respective streaming data, wherein each bitrate ladder is obtained from each respective client device, wherein each respective streaming data comprises a respective plurality of data flows, and wherein each respective plurality of data flows comprises a respective video data flow having respective one or more first tiles in a respective field of view of a respective 360 degree video and respective one or more second tiles not in the respective field of view;

obtaining, for each client device, at least one respective radio channel characteristic that characterizes communication with the respective client device;

determining, for each client device, a respective first boost rate, wherein for each client device the respective first boost rate is greater than the respective streaming rate cap, and wherein for each client device the respective first boost rate is based upon the respective bitrate ladder and upon bitrate ladders associated with other client devices of the plurality of client devices;

determining, for each client device, a respective second boost rate for the respective client device, wherein each second boost rate is determined by applying a respective upper bound to the respective first boost rate, the respective upper bound being a respective highest boost rate that the respective client device can benefit from when the at least one respective radio channel characteristic is taken into account; and enabling, for each client device, delivery to the respective client device of the respective streaming data up to the respective second boost rate that is determined, wherein based upon respective inference by the network of respective data flow type the respective second boost rate is applied to the respective one or more first tiles of the respective plurality of data flows without being applied to the respective one or more second tiles of the respective plurality of data flows.

17. The non-transitory computer-readable storage medium of claim 16, wherein the operations further comprise enabling delivery, to each client device, of the respective streaming data at the respective second boost rate.

18. The non-transitory computer-readable storage medium of claim 16, wherein the element of the network is a server, and wherein the server is configured to be in operative communication with each client device.

19. The non-transitory computer-readable storage medium of claim 18, wherein each client device is a mobile device, and wherein the server is configured to be in operative communication with each client device via one or more base stations.

20. The non-transitory computer-readable storage medium of claim 16, wherein for each client device the respective first boost rate is further based upon a respective buffer fill level.

\* \* \* \* \*